US011362759B2

(12) United States Patent
Papasakellariou

(10) Patent No.: US 11,362,759 B2
(45) Date of Patent: Jun. 14, 2022

(54) TRANSMISSION POWER CONTROL FOR AN UPLINK CONTROL CHANNEL

(71) Applicant: Samsung Electronics Co., Ltd., Suwon-si (KR)

(72) Inventor: Aris Papasakellariou, Houston, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 258 days.

(21) Appl. No.: 16/684,996

(22) Filed: Nov. 15, 2019

(65) Prior Publication Data

US 2020/0083980 A1 Mar. 12, 2020

Related U.S. Application Data

(63) Continuation of application No. 15/989,837, filed on May 25, 2018, now Pat. No. 10,498,482, which is a
(Continued)

(51) Int. Cl.
*H04L 1/00* (2006.01)
*H04L 1/16* (2006.01)
(Continued)

(52) U.S. Cl.
CPC .......... *H04L 1/0009* (2013.01); *H04L 1/0059* (2013.01); *H04L 1/0073* (2013.01); *H04L 1/1607* (2013.01); *H04L 1/1861* (2013.01); *H04L 5/00* (2013.01); *H04L 5/0053* (2013.01); *H04L 5/0094* (2013.01); *H04W 52/146* (2013.01); *H04W 52/325* (2013.01);
(Continued)

(58) Field of Classification Search
CPC ... H04L 1/0009; H04L 1/0059; H04L 1/0073; H04L 1/1607; H04L 1/1861; H04L 5/00; H04L 5/0053; H04L 5/0094; H04L 5/001; H04L 5/0048; H04W 52/146; H04W 52/325; H04W 52/34
See application file for complete search history.

(56) References Cited

U.S. PATENT DOCUMENTS

2009/0197630 A1    8/2009  Ahn et al.
2010/0304689 A1*  12/2010  McBeath ............. H04L 5/0005
                                                                 455/68
(Continued)

FOREIGN PATENT DOCUMENTS

CN    102300305 A    12/2011
CN    102348269 A     2/2012
(Continued)

OTHER PUBLICATIONS

Examination report dated Aug. 28, 2019 in connection with Australian Patent Application No. 2016246295, 4 pages.
(Continued)

*Primary Examiner* — Jenee Holland

(57) ABSTRACT

A base station indicates, to a user equipment (UE) configured for operation with carrier aggregation, a resource for a transmission of a physical uplink control channel (PUCCH) format that conveys acknowledgement information from the UE, and the UE determines the resource and a transmission power for the PUCCH format.

17 Claims, 8 Drawing Sheets

Related U.S. Application Data continuation of application No. 15/089,314, filed on Apr. 1, 2016, now Pat. No. 9,985,742.

(60) Provisional application No. 62/191,309, filed on Jul. 10, 2015, provisional application No. 62/172,946, filed on Jun. 9, 2015, provisional application No. 62/143,603, filed on Apr. 6, 2015.

(51) Int. Cl.
*H04L 1/18* (2006.01)
*H04L 5/00* (2006.01)
*H04W 52/14* (2009.01)
*H04W 52/32* (2009.01)
*H04W 52/34* (2009.01)
*H04W 52/54* (2009.01)

(52) U.S. Cl.
CPC ............. *H04W 52/34* (2013.01); *H04L 5/001* (2013.01); *H04L 5/0048* (2013.01)

(56) References Cited

U.S. PATENT DOCUMENTS

| | | | |
|---|---|---|---|
| 2011/0059764 A1 | 3/2011 | Dai et al. | |
| 2011/0075624 A1* | 3/2011 | Papasakellariou | H04W 48/12 370/329 |
| 2011/0164489 A1* | 7/2011 | Papasakellariou | H04L 5/0051 370/203 |
| 2011/0243066 A1* | 10/2011 | Nayeb Nazar | H04L 1/1671 370/328 |
| 2012/0044890 A1 | 2/2012 | Jen | |
| 2012/0063349 A1* | 3/2012 | Kim | H04L 27/2647 370/252 |
| 2012/0063413 A1* | 3/2012 | Kroener | H04W 72/04 370/330 |
| 2012/0113831 A1 | 5/2012 | Pelletier et al. | |
| 2012/0176884 A1* | 7/2012 | Zhang | H04W 72/042 370/203 |
| 2012/0320846 A1 | 12/2012 | Papasakellariou et al. | |
| 2013/0148614 A1 | 6/2013 | Noh et al. | |
| 2013/0155914 A1* | 6/2013 | Wang | H04L 1/0026 370/280 |
| 2013/0163535 A1 | 6/2013 | Anderson et al. | |
| 2013/0195041 A1 | 8/2013 | Papasakellariou et al. | |
| 2013/0208692 A1* | 8/2013 | Seo | H04L 5/14 370/329 |
| 2013/0230029 A1 | 9/2013 | Papasakellariou et al. | |
| 2013/0230030 A1 | 9/2013 | Papasakellariou et al. | |
| 2013/0336272 A1 | 12/2013 | Lin et al. | |
| 2014/0086174 A1* | 3/2014 | Nam | H04L 1/0026 370/329 |
| 2014/0092824 A1* | 4/2014 | He | H04W 76/30 370/329 |
| 2014/0092865 A1 | 4/2014 | Heo et al. | |
| 2014/0126491 A1 | 5/2014 | Ekpenyong et al. | |
| 2014/0198737 A1 | 7/2014 | Papasakellariou | |
| 2014/0204842 A1 | 7/2014 | Kim et al. | |
| 2014/0269454 A1 | 9/2014 | Papasakellariou | |
| 2014/0348078 A1 | 11/2014 | Kim et al. | |
| 2015/0071196 A1* | 3/2015 | Park | H04W 72/042 370/329 |
| 2015/0131579 A1 | 5/2015 | Li et al. | |
| 2015/0200752 A1 | 7/2015 | Yin et al. | |
| 2015/0264678 A1 | 9/2015 | Yin et al. | |
| 2015/0280883 A1 | 10/2015 | Seo et al. | |
| 2018/0184418 A1 | 6/2018 | Takeda et al. | |

FOREIGN PATENT DOCUMENTS

| | | |
|---|---|---|
| EP | 2637344 A2 | 9/2013 |
| EP | 2642682 A2 | 9/2013 |
| JP | 2015513863 A | 5/2015 |
| WO | 2016/163759 A1 | 10/2016 |
| WO | 2016/208680 A1 | 12/2016 |

OTHER PUBLICATIONS

Intellectual Property Office of Singapore, "Search Report", in connection with Singapore Patent Application No. 10201905868S dated Mar. 4, 2021, 8 pages.

Huawei, HiSilicon, "Power control to support up to 32 component carriers", 3GPP TSG RAN WG1 Meeting #81, May 25-29, 2015, R1-152465, 3 pages.

"3rd Generation Partnership Project; Technical Specification Group Radio Access Network; Evolved Universal Terrestrial Radio Access (E-UTRA); Physical layer procedures (Release 12)", 3GPP TS 36.213 V12.5.0 (Mar. 2015), 16 pages.

Samsung, "PUCCH Power Control in eCA", 3GPP TSG RAN WG1 #83, Nov. 16-20, 2015, R1-156752, 4 pages.

Office Action dated Mar. 20, 2020 in connection with Chinese Patent Application No. 201680033065.3, 14 pages.

Notice of Reasons for Refusal dated Feb. 10, 2020 in connection with Japanese Patent Application No. 2017-552860, 7 pages.

Office Action dated Jul. 23, 2020 in connection with Brazilian Patent Application No. BR112017021410-5, 8 pages.

IP Australia "Examination report No. 1 for standard patent application" dated Aug. 31, 2021, in connection with Australian Patent Application No. 2020205313, 5 pages.

European Patent Office, "European Search Report" dated Sep. 17, 2021, in connection with European Patent Application No. 21177107.6, 8 pages.

Japanese Patent Office, "Notice of Reasons for Refusal" dated Oct. 4, 2021, in connection with Japanese Patent Application No. 2017-552860, 7 pages.

3GPP TS 36.213 V.12.4.0 (Dec. 2014) Technical Specification; 3rd Generation Partnership Project; Technical Specification Group Radio Access Network; Evolved Universal Terrestrial Radio Access (E-UTRA); Physical layer procedures (Release 12), 225 pages.

Japanese Patent Office, Notice of Reasons for Refusal dated Mar. 14, 2022 regarding Application No. 2021-012463 3 pages.

Catt, "HARQ-ACK transmission for up to 32 CCs", 3GPP TSG RAN WG1 Meeting #80bis, R1-151349, Apr. 2015, 3 pages.

Nokia Networks, "Dynamic adaptation of HARQ-ACK feedback size and PUCCH format", 3GPP TSG-RAN WG1 Meeting #81, R1-152810, May 2015, 3 pages.

New Postcom, "Remaining aspects of PUCCH resource allocation for TDD", 3GPP TSG RAN WG1 Meeting #72, R1-130683, 4 pages.

* cited by examiner

TRANSMISSION POWER CONTROL FOR AN UPLINK CONTROL CHANNEL

CROSS-REFERENCE TO RELATED APPLICATIONS AND CLAIM OF PRIORITY

This application is a continuation of U.S. Non-Provisional patent application Ser. No. 15/989,837 entitled TRANSMISSION POWER CONTROL FOR AN UPLINK CONTROL CHANNEL and filed May 25, 2018, now U.S. Pat. No. 10,498,482, which is a continuation of U.S. Non-Provisional patent application Ser. No. 15/089,314 entitled TRANSMISSION POWER CONTROL FOR AN UPLINK CONTROL CHANNEL and filed Apr. 1, 2016, now U.S. Pat. No. 9,985,742, which claims priority to U.S. Provisional Patent Application No. 62/143,603 filed Apr. 6, 2015, U.S. Provisional Patent Application No. 62/172,946 filed Jun. 9, 2015, and U.S. Provisional Patent Application No. 62/191,309 filed Jul. 10, 2015. The content of the above-identified patent documents is hereby incorporated by reference.

TECHNICAL FIELD

The present application relates generally to wireless communications and, more specifically, to determining a power and a resource for a transmission of an uplink control channel in carrier aggregation operation.

BACKGROUND

Wireless communication has been one of the most successful innovations in modern history. Recently, the number of subscribers to wireless communication services exceeded five billion and continues to grow quickly. The demand of wireless data traffic is rapidly increasing due to the growing popularity among consumers and businesses of smart phones and other mobile data devices, such as tablets, "note pad" computers, net books, eBook readers, and machine type of devices. In order to meet the high growth in mobile data traffic and support new applications and deployments, improvements in radio interface efficiency and coverage is of paramount importance.

SUMMARY

This disclosure provides methods and apparatus for determining a resource and a power for a PUCCH format transmission.

In a first embodiment, a UE includes a transmitter. The transmitter configured to transmit a physical uplink control channel (PUCCH) of format F in a subframe i on cell c over a number of $M_{PUCCH,c}(i)$ resource blocks (RBs). The PUCCH conveys a number of $O_{UCI}$ binary elements (bits) that result from appending a number of $O_{CRC}$ cyclic redundancy check (CRC) bits to a number of $O_{UCI,0}$ uplink control information (UCI) bits. The $O_{UCI}$ bits are encoded and mapped to $N_{RE}$ resource elements of the PUCCH. The PUCCH transmission power $P_{PUCCH,c}(i)$ depends on a ratio of $O_{UCI}$ over $N_{RE}$.

In a second embodiment, a UE includes a controller, a cyclic redundancy check (CRC) generator, a first encoder, a processor, and a transmitter. The controller is configured to provide a number $O_{UCI,0}$ of uplink control information (UCI) binary elements (bits) to a cyclic redundancy check (CRC) generator when $O_{UCI,0}$ is larger than a predetermined value. The CRC generator is configured to compute a number of $O_{CRC}$ CRC bits for the number of $O_{UCI,0}$ UCI bits and append the $O_{CRC}$ CRC bits to the $O_{UCI,0}$ UCI bits to result $O_{UCI}=O_{UCI,0}+O_{CRC}$ bits. The first encoder is configured to encode the $O_{UCI}$ bits. The processor is configured to determine a transmission power $P_{PUCCH,c}(i)$ for a physical uplink control channel (PUCCH) of first format F that conveys the encoded $O_{UCI}$ bits in a subframe i on a cell c. The transmitter is configured to transmit the PUCCH of first format F in a subframe i on cell c over a number $M_{PUCCH,c}(i)$ of resource blocks (RBs) with power $P_{PUCCH,c}(i)$ that is a function of a ratio of $O_{UCI}$ over a number $N_{RE}$ of resource elements used for the transmission of the encoded $O_{UCI}$ bits.

In a third embodiment, a base station includes a transmitter and a receiver. The transmitter is configured to transmit first downlink control information (DCI) formats in a first subframe (SF) and second DCI formats in a second SF after the first SF. The first DCI formats and the second DCI formats trigger acknowledgement information in a physical uplink control channel (PUCCH) having a format. All first DCI formats, except one DCI format, include same information for a first resource for a reception of a first PUCCH format. All second DCI formats include same information for a second resource for a reception of a second PUCCH format that is different than the first PUCCH format. The receiver is configured to receive the second PUCCH format in the second resource.

In a fourth embodiment, a UE includes a receiver and a transmitter. The receiver configured to receive first downlink control information (DCI) formats in a first subframe (SF) and second DCI formats in a second SF after the first SF. The first DCI formats and the second DCI formats trigger acknowledgement information in a physical uplink control channel (PUCCH) having a format. All first DCI formats, except one DCI format, include same information for a first resource for a transmission of a first PUCCH format. All second DCI formats include same information for a second resource for a transmission of a second PUCCH format that is different than the first PUCCH format. The transmitter configured to transmit the second PUCCH format in the second resource.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C"

includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this disclosure. Those of ordinary skill in the art should understand that in many if not most instances such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 15, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

The following patent documents and standards descriptions are hereby incorporated by reference into the present disclosure as if fully set forth herein: 3GPP TS 36.211 v12.4.0, "E-UTRA, Physical channels and modulation" (REF 1); 3GPP TS 36.212 v12.4.0, "E-UTRA, Multiplexing and Channel coding" (REF 2); 3GPP TS 36.213 v12.4.0, "E-UTRA, Physical Layer Procedures" (REF 3); 3GPP TS 36.331 v12.4.0, "E-UTRA, Radio Resource Control (RRC) Protocol Specification" (REF 4); U.S. Pat. No. 8,588,259, entitled "MULTIPLEXING LARGE PAYLOADS OF CONTROL INFORMATION FROM USER EQUIPMENTS" (REF 5); and a set of U.S. Provisional Patent Applications (U.S. Provisional Patent Application No. 62/143,569 filed Apr. 6, 2015; U.S. Provisional Patent Application No. 62/145,267 filed Apr. 9, 2015; U.S. Provisional Patent Application No. 62/172,306 filed Jun. 8, 2015; and U.S. Provisional Patent Application Ser. No. 62/144,684 filed Apr. 8, 2015) (collectively "REF 6").

One or more embodiments of the present disclosure relate to determining a power and a resource for a transmission of an uplink control channel in carrier aggregation operation. A wireless communication network includes a downlink (DL) that conveys signals from transmission points, such as base stations or enhanced NodeBs (eNBs), to UEs. The wireless communication network also includes an uplink (UL) that conveys signals from UEs to reception points, such as eNBs.

Figure 1:
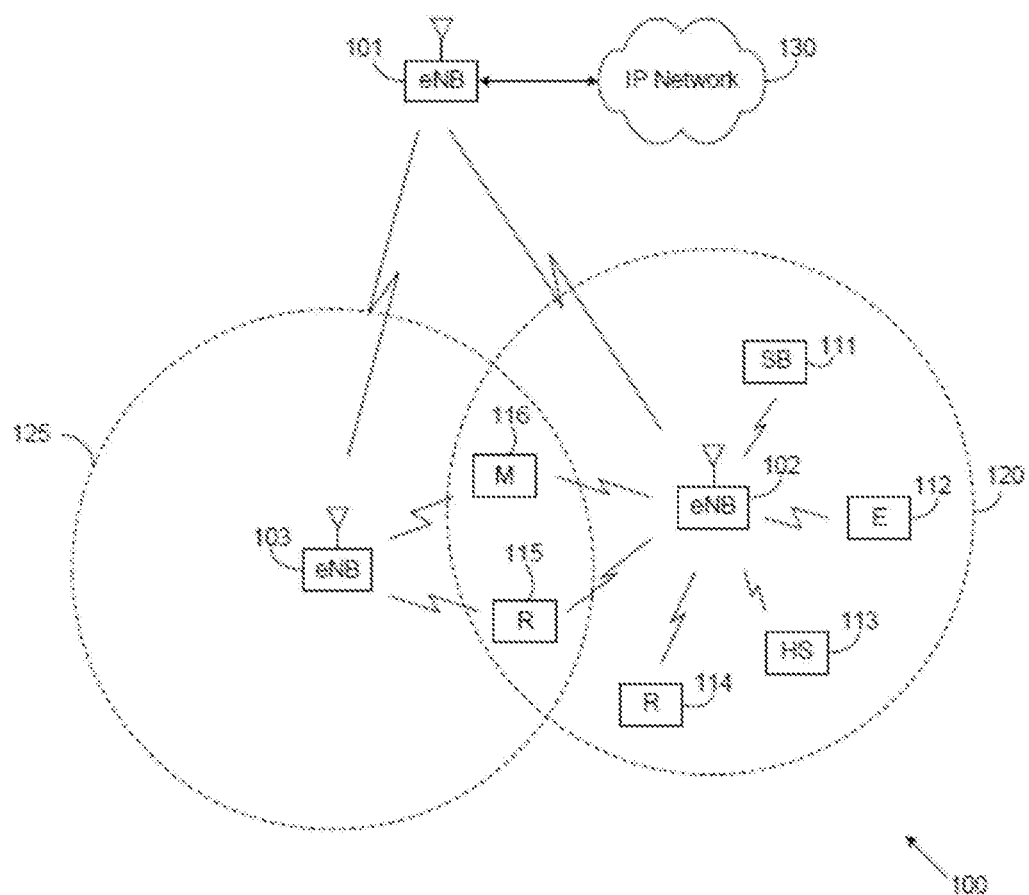
FIG. 1 illustrates an example wireless communication network according to this disclosure.

FIG. 1 illustrates an example wireless network 100 according to this disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes an eNB 101, an eNB 102, and an eNB 103. The eNB 101 communicates with the eNB 102 and the eNB 103. The eNB 101 also communicates with at least one Internet Protocol (IP) network 130, such as the Internet, a proprietary IP network, or other data network.

Depending on the network type, other well-known terms may be used instead of "eNodeB" or "eNB," such as "base station" or "access point." For the sake of convenience, the terms "eNodeB" and "eNB" are used in this patent document to refer to network infrastructure components that provide wireless access to remote terminals. Also, depending on the network type, other well-known terms may be used instead of "user equipment" or "UE," such as "mobile station," "subscriber station," "remote terminal," "wireless terminal," or "user device." A UE may be fixed or mobile and may be a cellular phone, a personal computer device, and the like. For the sake of convenience, the terms "user equipment" and "UE" are used in this patent document to refer to remote wireless equipment that wirelessly accesses an eNB, whether the UE is a mobile device (such as a mobile telephone or smart-phone) or is normally considered a stationary device (such as a desktop computer or vending machine).

The eNB 102 provides wireless broadband access to the network 130 for a first plurality of user equipments (UEs) within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 114, which may be a mobile device (M) like a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 114. In some embodiments, one or more of the eNBs 101-103 may communicate with each other and with the UEs 111-116 using 5G, LTE, LTE-A, WiMAX, or other advanced wireless communication techniques.

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

As described in more detail below, various components of the network 100 (such as the eNBs 101-103 and/or the UEs 111-116) support the adaptation of communication direction in the network 100, and can provide support for DL or UL transmissions in carrier aggregation operation.

Although FIG. 1 illustrates one example of a wireless network 100, various changes may be made to FIG. 1. For example, the wireless network 100 could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly between them or with the network 130 and provide UEs with direct wireless broadband access to the network 130. Further, the eNB 101, 102, and/or 103 could provide access to other or additional external networks, such as external telephone networks or other types of data networks.

Figure 2:
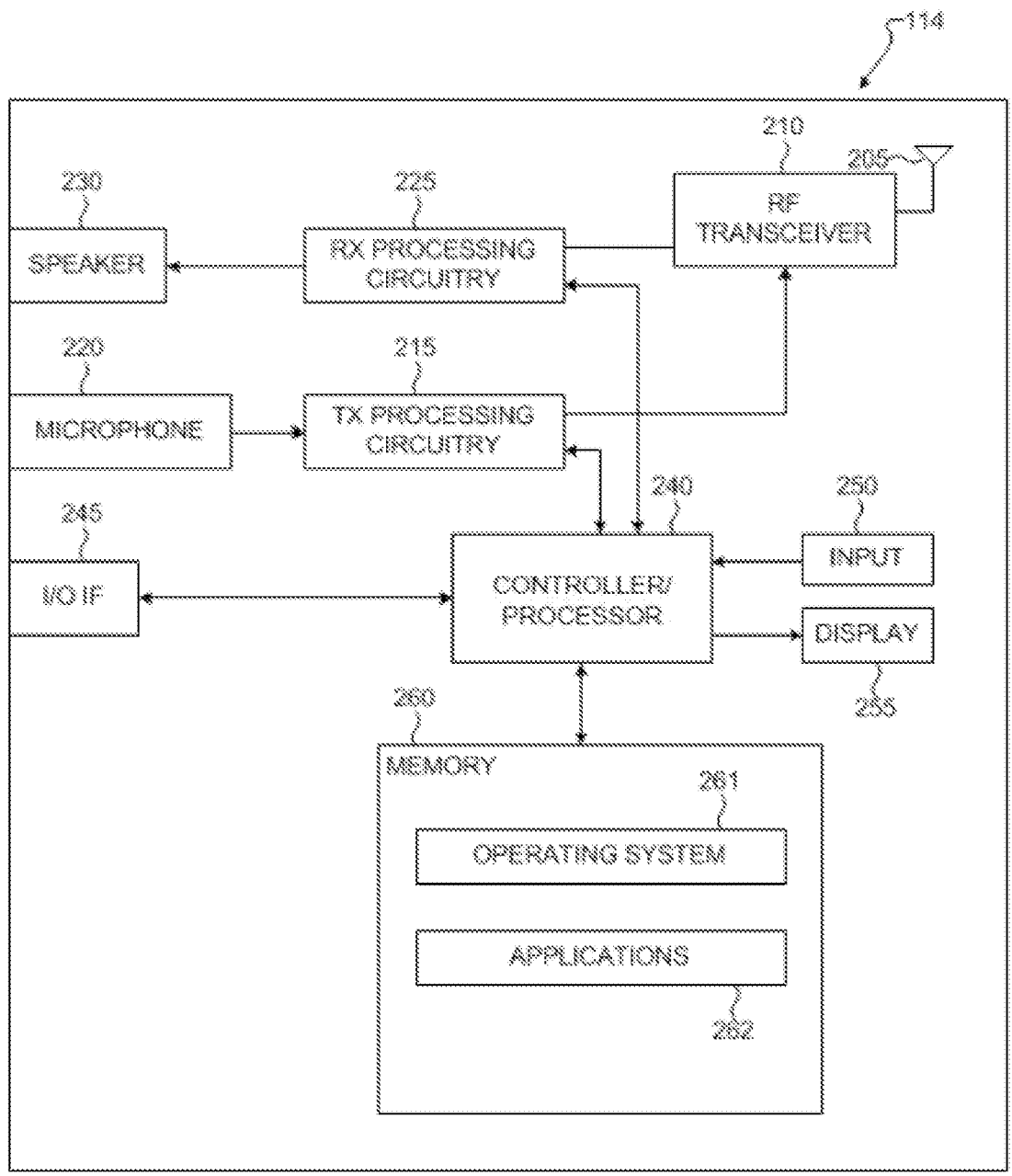
FIG. 2 illustrates an example user equipment (UE) according to this disclosure.

FIG. 2 illustrates an example UE 114 according to this disclosure. The embodiment of the UE 114 shown in FIG. 2 is for illustration only, and the other UEs in FIG. 1 could have the same or similar configuration. However, UEs come in a wide variety of configurations, and FIG. 2 does not limit the scope of this disclosure to any particular implementation of a UE.

As shown in FIG. 2, the UE 114 includes an antenna 205, a radio frequency (RF) transceiver 210, transmit (TX) processing circuitry 215, a microphone 220, and receive (RX) processing circuitry 225. The UE 114 also includes a speaker 230, a controller/processor 240, an input/output (I/O) interface (IF) 245, an input 250, a display 255, and a memory 260. The memory 260 includes an operating system (OS) program 261 and one or more applications 262.

The RF transceiver 210 receives, from the antenna 205, an incoming RF signal transmitted by an eNB or another UE. The RF transceiver 210 down-converts the incoming RF signal to generate an intermediate frequency (IF) or baseband signal. The IF or baseband signal is sent to the RX processing circuitry 225, which generates a processed baseband signal by filtering, decoding, and/or digitizing the baseband or IF signal. The RX processing circuitry 225 transmits the processed baseband signal to the speaker 230 (such as for voice data) or to the controller/processor 240 for further processing (such as for web browsing data).

The TX processing circuitry 215 receives analog or digital voice data from the microphone 220 or other outgoing baseband data (such as web data, e-mail, or interactive video game data) from the controller/processor 240. The TX processing circuitry 215 encodes, multiplexes, and/or digitizes the outgoing baseband data to generate a processed baseband or IF signal. The RF transceiver 210 receives the outgoing processed baseband or IF signal from the TX processing circuitry 215 and up-converts the baseband or IF signal to an RF signal that is transmitted via the antenna 205.

The controller/processor 240 can include one or more processors or other processing devices and can execute the OS program 261 stored in the memory 260 in order to control the overall operation of the UE 114. For example, the controller/processor 240 could control the reception of forward channel signals and the transmission of reverse channel signals by the RF transceiver 210, the RX processing circuitry 225, and the TX processing circuitry 215 in accordance with well-known principles. In some embodiments, the controller/processor 240 includes at least one microprocessor or microcontroller.

The controller/processor 240 is also capable of executing other processes and programs resident in the memory 260. The controller/processor 240 can move data into or out of the memory 260 as required by an executing process. In some embodiments, the controller/processor 240 is configured to execute the applications 262 based on the OS program 261 or in response to signals received from eNBs, other UEs, or an operator. The controller/processor 240 is also coupled to the I/O interface 245, which provides the UE 114 with the ability to connect to other devices such as laptop computers and handheld computers. The I/O interface 245 is the communication path between these accessories and the controller/processor 240.

The controller/processor 240 is also coupled to the input 250 (e.g., touchscreen, keypad, etc.) and the display 255. The operator of the UE 114 can use the input 250 to enter data into the UE 114. The display 255 may be a liquid crystal display or other display capable of rendering text and/or at least limited graphics, such as from web sites. The display 255 could also represent a touch-screen.

The memory 260 is coupled to the controller/processor 240. Part of the memory 260 could include a control or data signaling memory (RAM), and another part of the memory 260 could include a Flash memory or other read-only memory (ROM).

As described in more detail below, the transmit and receive paths of the UE 114 (implemented using the RF transceiver 210, TX processing circuitry 215, and/or RX processing circuitry 225) support respective DL or UL transmissions in carrier aggregation operation.

Although FIG. 2 illustrates one example of UE 114, various changes may be made to FIG. 2. For example, various components in FIG. 2 could be combined, further subdivided, or omitted and additional components could be added according to particular needs. As a particular example, the controller/processor 240 could be divided into multiple processors, such as one or more central processing units (CPUs) and one or more graphics processing units (GPUs). Also, while FIG. 2 illustrates the UE 114 configured as a mobile telephone or smart-phone, UEs could be configured to operate as other types of mobile or stationary devices. In addition, various components in FIG. 2 could be replicated, such as when different RF components are used to communicate with the eNBs 101-103 and with other UEs.

Figure 3:
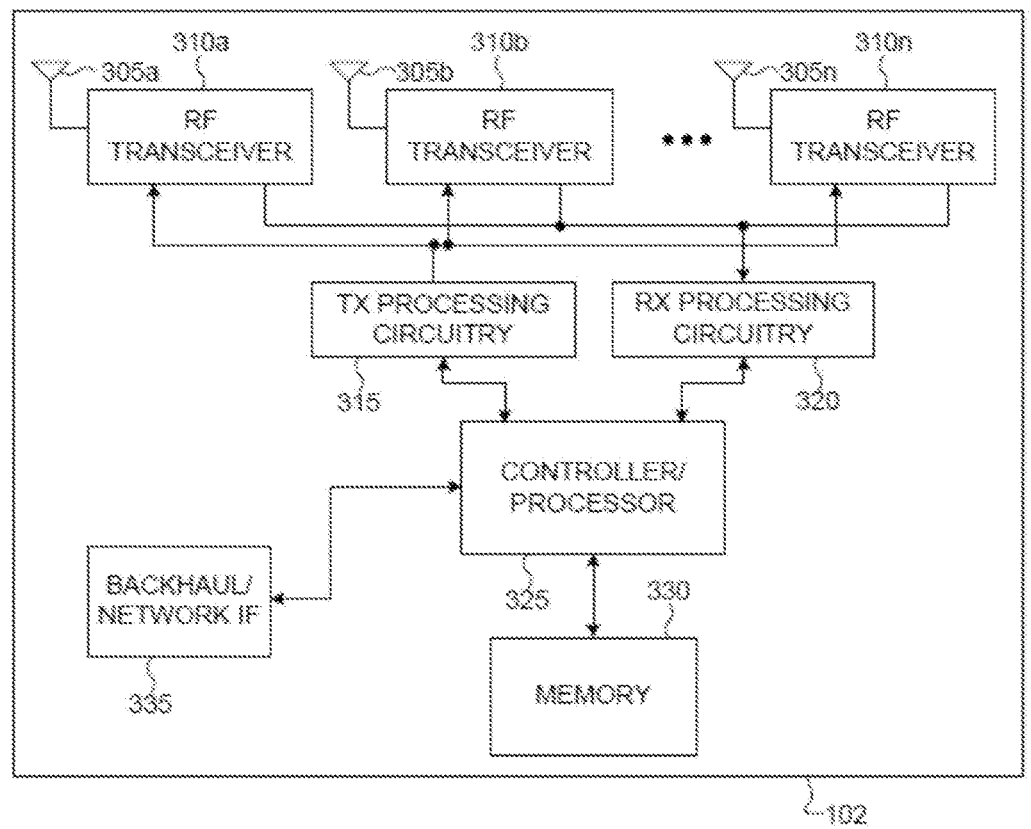
FIG. 3 illustrates an example enhanced NodeB (eNB) according to this disclosure.

FIG. 3 illustrates an example eNB 102 according to this disclosure. The embodiment of the eNB 102 shown in FIG. 3 is for illustration only, and other eNBs of FIG. 1 could have the same or similar configuration. However, eNBs come in a wide variety of configurations, and FIG. 3 does not limit the scope of this disclosure to any particular implementation of an eNB.

As shown in FIG. 3, the eNB 102 includes multiple antennas 305a-305n, multiple RF transceivers 310a-310n, transmit (TX) processing circuitry 315, and receive (RX) processing circuitry 320. The eNB 102 also includes a controller/processor 325, a memory 330, and a backhaul or network interface 335.

The RF transceivers 310a-310n receive, from the antennas 305a-305n, incoming RF signals, such as signals transmitted by UEs or other eNBs. The RF transceivers 310a-310n down-convert the incoming RF signals to generate IF or baseband signals. The IF or baseband signals are sent to the RX processing circuitry 320, which generates processed baseband signals by filtering, decoding, and/or digitizing the baseband or IF signals. The RX processing circuitry 320 transmits the processed baseband signals to the controller/processor 325 for further processing.

The TX processing circuitry 315 receives analog or digital data (such as voice data, web data, e-mail, or interactive video game data) from the controller/processor 325. The TX processing circuitry 315 encodes, multiplexes, and/or digitizes the outgoing baseband data to generate processed baseband or IF signals. The RF transceivers 310a-310n receive the outgoing processed baseband or IF signals from the TX processing circuitry 315 and up-converts the baseband or IF signals to RF signals that are transmitted via the antennas 305a-305n.

The controller/processor 325 can include one or more processors or other processing devices that control the overall operation of the eNB 102. For example, the controller/processor 325 could control the reception of forward channel signals and the transmission of reverse channel signals by the RF transceivers 310a-310n, the RX processing circuitry 320, and the TX processing circuitry 315 in accordance with well-known principles. The controller/processor 325 could support additional functions as well, such as more advanced wireless communication functions. For instance, the controller/processor 325 could support beam forming or directional routing operations in which outgoing signals from multiple antennas 305a-305n are weighted differently to effectively steer the outgoing signals in a desired direction. Any of a wide variety of other functions could be supported in the eNB 102 by the controller/processor 325. In some embodiments, the controller/processor 325 includes at least one microprocessor or microcontroller.

The controller/processor 325 is also capable of executing programs and other processes resident in the memory 330, such as an OS. The controller/processor 325 can move data into or out of the memory 330 as required by an executing process.

The controller/processor 325 is also coupled to the backhaul or network interface 335. The backhaul or network interface 335 allows the eNB 102 to communicate with other devices or systems over a backhaul connection or over a network. The interface 335 could support communications over any suitable wired or wireless connection(s). For example, when the eNB 102 is implemented as part of a cellular communication system (such as one supporting 5G, LTE, or LTE-A), the interface 335 could allow the eNB 102 to communicate with other eNBs, such as eNB 103, over a wired or wireless backhaul connection. When the eNB 102 is implemented as an access point, the interface 335 could allow the eNB 102 to communicate over a wired or wireless local area network or over a wired or wireless connection to a larger network (such as the Internet). The interface 335 includes any suitable structure supporting communications over a wired or wireless connection, such as an Ethernet or RF transceiver.

The memory 330 is coupled to the controller/processor 325. Part of the memory 330 could include a RAM, and another part of the memory 330 could include a Flash memory or other ROM.

As described in more detail below, the transmit and receive paths of the eNB 102 (implemented using the RF transceivers 310a-310n, TX processing circuitry 315, and/or RX processing circuitry 320) support respective DL or UL transmissions in carrier aggregation operation.

Although FIG. 3 illustrates one example of an eNB 102, various changes may be made to FIG. 3. For example, the eNB 102 could include any number of each component shown in FIG. 3. As a particular example, an access point could include a number of interfaces 335, and the controller/processor 325 could support routing functions to route data between different network addresses. As another particular example, while shown as including a single instance of TX processing circuitry 315 and a single instance of RX processing circuitry 320, the eNB 102 could include multiple instances of each (such as one per RF transceiver). In some wireless networks, DL signals can include data signals conveying information content, control signals conveying DL control information (DCI), and reference signals (RS) that are also known as pilot signals. An eNB, such as eNB 102, can transmit one or more of multiple types of RS, including UE-common RS (CRS), channel state information RS (CSI-RS), and demodulation RS (DMRS). A CRS can be transmitted over a DL system bandwidth (BW) and can be used by a UE, such as UE 114, to demodulate data or control signals or to perform measurements. To reduce CRS overhead, eNB 102 can transmit a CSI-RS with a smaller density in the time domain than a CRS (see also REF 1 and REF 3). UE 114 can use either a CRS or a CSI-RS to perform measurements and a selection can be based on a transmission mode (TM) UE 114 is configured by eNB 102 for physical DL shared channel (PDSCH) reception (see also REF 3). Finally, UE 114 can use a DMRS to demodulate data or control signals. The eNB 102 can transmit data information to UE 114 through a PDSCH. The transport channel transferring information from a PDSCH to higher layers is referred to as DL shared channel (DL-SCH). An eNB can transmit DCI to a UE through a DCI format transmission in a physical DL control channel (PDCCH).

In some wireless networks, UL signals can include data signals conveying information content, control signals conveying UL control information (UCI), and RS. A UE, such as UE 114, can transmit data information or UCI through a respective physical UL shared channel (PUSCH) or a physical UL control channel (PUCCH) to an eNB, such as eNB 102. The transport channel transferring information from a PUSCH to higher layers is referred to as UL shared channel (UL-SCH). When UE 114 simultaneously transmits data information and UCI, UE 114 can multiplex both in a PUSCH or simultaneously transmit data information and possibly some UCI in a PUSCH and transmit some or all UCI in a PUCCH. UCI can include hybrid automatic repeat request acknowledgement (HARQ-ACK) information indicating correct or incorrect detection of data transport blocks (TBs) in respective PDSCHs, scheduling request (SR) information indicating to eNB 102 whether UE 114 has data in its buffer, and channel state information (CSI) enabling eNB 102 to select appropriate parameters for PDSCH or PDCCH transmissions to UE 114. HARQ-ACK information can include a positive acknowledgement (ACK) in response to a correct PDCCH or data TB detection, a negative acknowledgement (NACK) in response to incorrect data TB detection, and an absence of PDCCH detection (DTX) that can be implicit or explicit. A DTX can be implicit when UE 114 does not transmit a HARQ-ACK signal. It is also possible to represent NACK and DTX with a same NACK/DTX state in the HARQ-ACK information (see also REF 3).

CSI can include a channel quality indicator (CQI) informing eNB 102 of a transport block size (TBS) having a modulation and coding scheme (MCS) that can be received by UE 114 with a predefined target block error rate (BLER), a precoding matrix indicator (PMI) informing eNB 102 how to combine signals from multiple transmitted antennas in accordance with a multiple input multiple output (MIMO) transmission principle, and a rank indicator (RI) indicating a transmission rank for a PDSCH (see also REF 3). For example, UE 114 can determine a CQI from a signal-to-interference and noise ratio (SINR) measurement while also considering a configured PDSCH TM and the UE 114 receiver characteristics. A UE can use a CRS or a CSI-RS transmission from an eNB to determine a CSI (see also REF 3). The eNB 102 can configure UE 114 to periodically transmit CSI (P-CSI) on a PUCCH or to dynamically transmit aperiodic CSI (A-CSI) on a PUSCH (see also REF2 and REF 3).

UL RS can include DMRS and sounding RS (SRS). DMRS can be transmitted only in a BW of a respective PUSCH or PUCCH and eNB 102 can use a DMRS to demodulate information in a PUSCH or PUCCH. SRS can be transmitted by UE 114 in order to provide eNB 102 with a UL CSI (see also REF 2 and REF 3).

The eNB 102 can schedule PDSCH transmission to UE 114 or PUSCH transmission from UE 114 through respective DCI formats conveyed by respective PDCCHs. DCI formats can also provide other functionalities (see also REF 2).

A transmission time interval (TTI) for DL signaling or for UL signaling is one subframe (SF). For example, a SF duration can be one millisecond (msec). A unit of 10 SFs, indexed from 0 to 9, is referred to as a system frame. In a time division duplex (TDD) system, a communication direction in some SFs is in the DL, and a communication direction in some other SFs is in the UL.

Figure 4:
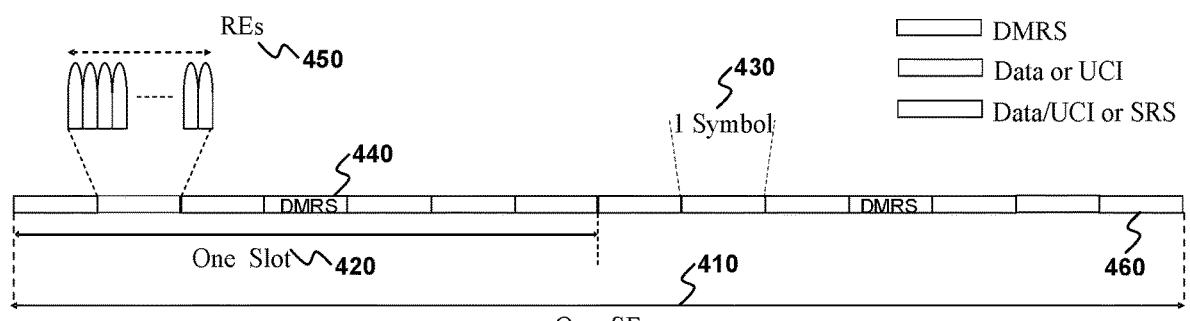
FIG. 4 illustrates an example UL SF structure for PUSCH transmission or PUCCH transmission according to this disclosure.

FIG. 4 illustrates an example UL SF structure for PUSCH transmission or PUCCH transmission according to this disclosure. The embodiment of the UL SF structure shown in FIG. 4 is for illustration only. Other embodiments could be used without departing from the scope of the present disclosure.

UL signaling can use Discrete Fourier Transform Spread OFDM (DFT-S-OFDM). An UL SF 410 includes two slots. Each slot 420 includes $A_{SeNB,1}$ symbols 430 where UE 114 transmits data information, UCI, or RS including one symbol per slot where UE 114 transmits DMRS 440. A transmission BW includes frequency resource units that are referred to as resource blocks (RBs). Each RB includes $A_{SeNB,2}$ (virtual) sub-carriers that are referred to as resource elements (REs). A transmission unit of one RB over one slot is referred to as a physical RB (PRB) and transmission unit of one RB over one SF is referred to as a PRB pair. UE 114 is assigned $M_{PUXCH}$ RBs for a total of $M_{sc}^{PUXCH} = M_{PUSCH} \cdot N_{sc}^{RB}$ REs 450 for a PUSCH transmission BW ('X'='S') or for a PUCCH transmission BW ('X'='C'). A last SF symbol can be used to multiplex SRS transmissions 460 from one or more UEs. A number of UL SF symbols available for data/UCI/DMRS transmission is $N_{symb}^{PUXCH} = 2 \cdot (N_{symb}^{UL} - 1) - N_{SRS}$. $N_{SRS} = 1$ when a last SF symbol supports SRS transmissions from UEs that overlap at least partially in BW with a PUXCH transmission BW; otherwise, $N_{SRS} = 0$. Therefore, a number of total REs for a PUXCH transmission is $M_{sc}^{PUXCH} \cdot N_{symb}^{PUXCH}$.

When the structure in FIG. 4 is used to transmit UCI (HARQ-ACK or P-CSI) in a PUCCH, there is no data information included and UCI can be mapped over all REs except for REs used to transmit DMRS or SRS.

Figure 5:
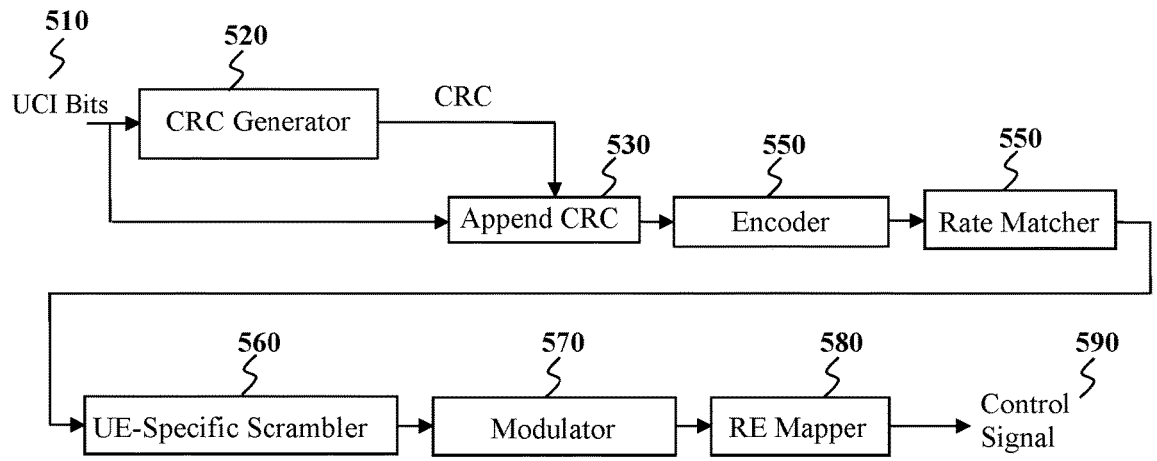
FIG. 5 illustrates an example encoding and modulation process for UCI according to this disclosure.

FIG. 5 illustrates an example encoding and modulation process for UCI according to this disclosure. The embodiment of the encoding process shown in FIG. 5 is for illustration only. Other embodiments could be used without departing from the scope of the present disclosure.

Upon determining that a number $O_{UCI,0}$ of UCI bits is larger than a predetermined value, a UE 114 controller (not shown) provides the UCI bits 510 to a CRC generator 520 that computes a CRC for the $O_{UCI,0}$ UCI bits and appends $O_{CRC}$ CRC bits, such as 8 CRC bits, to the $O_{UCI,0}$ UCI bits to result $O_{UCI}$ UCI and CRC bits 530. An encoder 540, such as a tail biting convolutional code (TBCC), encodes the output of $O_{UCI}$ bits. A rate matcher 550 performs rate matching to allocated resources, followed by a scrambler 560 to perform scrambling, a modulator 570 to modulate the encoded bits, for example using QPSK, an RE mapper 580, and finally a transmitter for a transmission of a control signal 590.

Figure 6:
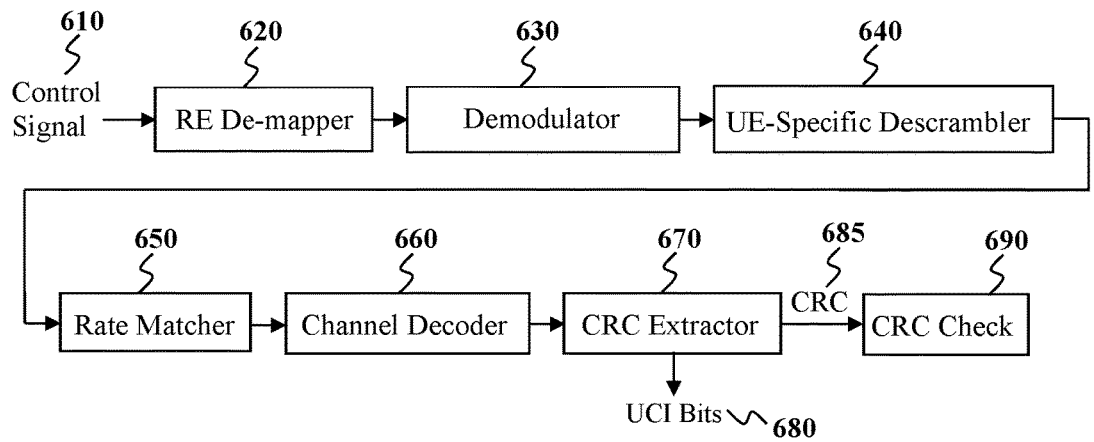
FIG. 6 illustrates an example demodulation and decoding process for UCI according to this disclosure.

FIG. 6 illustrates an example demodulation and decoding process for UCI according to this disclosure. The embodiment of the decoding process shown in FIG. 6 is for illustration only. Other embodiments could be used without departing from the scope of the present disclosure.

The eNB 102 receives a control signal 610 that is provided to a RE demapper 620 to perform RE demapping, a demodulator 630 to perform demodulation for a corresponding modulation scheme, a descrambler 640 to perform descrambling, a rate matcher 650 to perform rate matching, and a decoder 660, such as a TBCC decoder, to perform decoding and provide $O_{UCI}$ UCI and CRC bits. A CRC extraction unit 670 separates $O_{UCI,0}$ UCI bits 680 and $O_{CRC}$ CRC bits 685, and a CRC checking unit 690 computes a CRC check. When the CRC check passes (CRC checksum is zero), eNB 102 determines that the UCI is valid.

Figure 7:
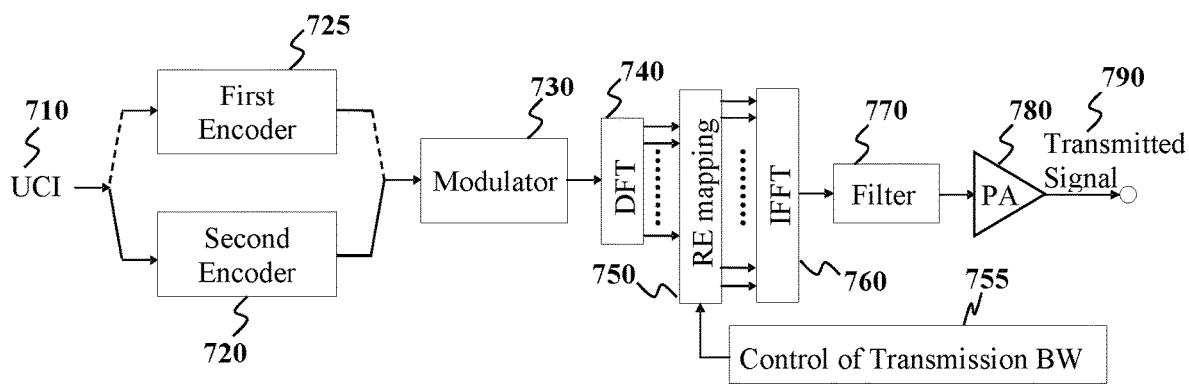
FIG. 7 illustrates an example UE transmitter for a PUCCH having a same SF structure as a PUSCH according to this disclosure.

FIG. 7 illustrates an example UE transmitter for a PUCCH having a same SF structure as a PUSCH according to this disclosure. The embodiment of the transmitter shown in FIG. 7 is for illustration only. Other embodiments could be used without departing from the scope of the present disclosure.

UCI bits 710 from UE 114, such as $O_{P\text{-}CSI}$ P-CSI information bits, when any, and $O_{HARQ\text{-}ACK}$ HARQ-ACK information bits, when any, but also a SR bit in a SF configured to UE 114 for SR transmission (not shown), are jointly encoded either by a first encoder 720, for example using tail-biting convolutional coding (TBCC) or turbo coding (TC) and cyclic redundancy check (CRC) bits are included in each encoded codeword (see also REF 2) or by a second encoder 725, for example using Reed-Muller (RM) coding. An encoder selection is by a controller (e.g., controller/processor 240 of FIG. 2) where, for example, the controller selects the TBCC encoder when a HARQ-ACK payload is larger than a predetermined value, such as 22 bits, and the controller selects the RM encoder when a HARQ-ACK payload is not larger than a predetermined value. Encoded bits are subsequently modulated by modulator 730. A discrete Fourier transform (DFT) is obtained by DFT unit 740, REs 750 corresponding to a PUCCH transmission BW are selected by selector 755, an inverse fast Fourier transform (IFFT) is performed by IFFT unit 760, an output is filtered and by filter 770, a processor applies a power according to a power control procedure to power amplifier (PA) 780, and a transmitted 790 transmits a signal. Due to the DFT mapping, the REs can be viewed as virtual REs but are referred to as REs for simplicity. For brevity, additional transmitter circuitry such as digital-to-analog converter, filters, amplifiers, and transmitter antennas are omitted.

A UE transmitter block diagram for data in a PUSCH can be obtained as in FIG. 7 by replacing HARQ-ACK information and CSI with data information.

Figure 8:
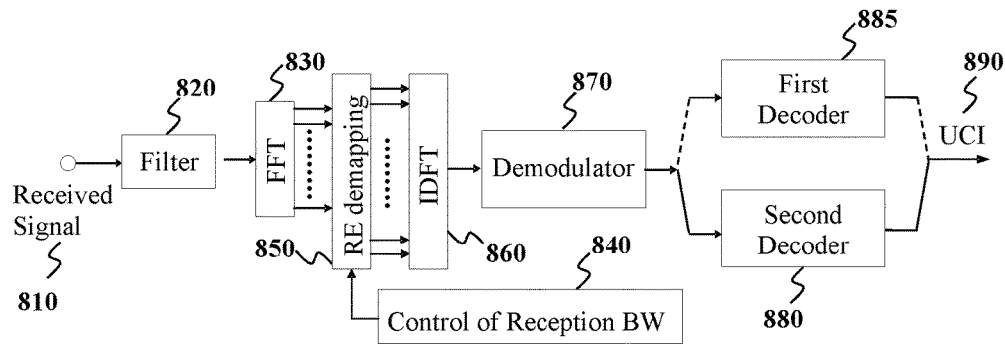
FIG. 8 illustrates an example eNB receiver for a PUCCH having a same SF structure as a PUSCH according to this disclosure.

FIG. 8 illustrates an example eNB receiver for a PUCCH having a same SF structure as a PUSCH according to this disclosure. The embodiment of the receiver shown in FIG. 8 is for illustration only. Other embodiments could be used without departing from the scope of the present disclosure.

A received signal 810 is filtered by filter 820, a fast Fourier transform (FFT) is applied by FFT unit 830, a selector unit 840 selects REs 850 used by a transmitter, an inverse DFT (IDFT) unit applies an IDFT 860, a demodulator 870 demodulates the IDFT output using a channel estimate provided by a channel estimator (not shown), and a controller (e.g., controller/processor 240 of FIG. 2) selects a first decoder 880, for example using tail-biting convolutional decoding or turbo decoding and CRC bits are extracted from each decoded codeword, or a second decoder 885, for example using RM decoding. For example, the controller selects the TBCC decoder when an expected HARQ-ACK payload is larger than a predetermined value, such as 22 bits, and the controller selects the RM decoder when an expected HARQ-ACK payload is not larger than a predetermined value. UCI bits 890 are obtained by an output of either the first decoder or the second decoder. Additional receiver circuitry such as an analog-to-digital converter, filters, and channel estimator, are not shown for brevity.

An eNB receiver block diagram for data in a PUSCH can be obtained as in FIG. 8 by replacing HARQ-ACK information and CSI with data information.

In a TDD communication system, a communication direction in some SFs is in the DL, and a communication direction in some other SFs is in the UL. TABLE 1 lists indicative UL/DL configurations over a period of 10 SFs that is also referred to as frame period. "D" denotes a DL SF, "U" denotes an UL SF, and "S" denotes a special SF that includes a DL transmission field referred to as DwPTS, a guard period (GP), and a UL transmission field referred to as UpPTS. Several combinations exist for a duration of each field in a special SF subject to the condition that the total duration is one SF (see also REF 1).

TABLE 1

TDD UL/DL configurations

| TDD UL-DL Config-uration | DL-to-UL Switch-point periodicity | SF number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 msec | D | S | U | U | U | D | S | U | U | U |
| 1 | 5 msec | D | S | U | U | D | D | S | U | U | D |
| 2 | 5 msec | D | S | U | D | D | D | S | U | D | D |
| 3 | 10 msec | D | S | U | U | U | D | D | D | D | D |
| 4 | 10 msec | D | S | U | U | D | D | D | D | D | D |
| 5 | 10 msec | D | S | U | D | D | D | D | D | D | D |
| 6 | 5 msec | D | S | U | U | U | D | S | U | U | D |

In a TDD system, a HARQ-ACK signal transmission from UE 114 in response to PDSCH receptions in multiple DL SFs can be transmitted in a same UL SF. A number $M_W$ of DL SFs having associated HARQ-ACK signal transmissions from UE 114 in a same UL SF is referred to as a DL association set or as a bundling window of size $M_W$. A DL DCI format includes a DL assignment index (DAI) field of two binary elements (bits) that provides a counter indicating a number of DL DCI formats, modulo 4, transmitted to UE 114 in a bundling window up to the SF of the DL DCI format detection. TABLE 2 indicates DL SFs n−k, where k∈K, that UE 114 transmits an associated HARQ-ACK signal in UL SF n. These DL SFs represent a bundling window for a respective UL SF.

TABLE 2

Downlink association set index K: $\{k_0, k_1, L \cdot k_{M-1}\}$

| TDD UL/DL Config-uration | SF n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

A transmission power for a PUSCH is determined so that a PUSCH transmission from UE 114 is received with a desired SINR at eNB 102 while controlling a respective interference to neighboring cells thereby achieving a BLER target for data TBs in the PUSCH and ensuring proper network operation. UL power control (PC) includes open-loop PC (OLPC) with cell-specific and UE-specific parameters and closed-loop PC (CLPC) corrections provided to a UE by an eNB through transmission PC (TPC) commands. When a PUSCH transmission is scheduled by a PDCCH, a TPC command is included in a respective DCI format (see also REF 2). TPC commands can also be provided by a separate PDCCH conveying a DCI format 3 or a DCI format 3A, for brevity jointly referred to as DCI format 3/3A, providing TPC commands to a group of UEs (see also REF 2). A DCI format includes cyclic redundancy check (CRC) bits and UE 114 identifies a DCI format type from a respective radio network temporary identifier (RNTI) used to scramble the CRC bits. For DCI format 3/3A, a RNTI is a TPC-RNTI that UE 114 is configured by eNB 102 through higher layer signaling, such as radio resource control (RRC) signaling. For a DCI format scheduling a PUSCH transmission from UE 114 or a PDSCH transmission to UE 114, a RNTI is a Cell RNTI (C-RNTI). Additional RNTI types also exist (see also REF 2).

UE 114 can derive a PUSCH transmission power $P_{PUSCH,c}(i)$, in decibels per milliwatt (dBm), in cell c and SF i as in Equation (1). For simplicity, it is assumed that UE 114 does not transmit both PUSCH and PUCCH in a same SF (see also REF 3).

$$P_{PUSCH,c}(i) = \min\left\{\begin{array}{l} P_{CMAX,c}(i), \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{array}\right\} [dBm] \quad (1)$$

where, $P_{CMAX,c}(i)$ is a configured UE 114 transmission power in cell c and SF i (see also REF 3).

$M_{PUSCH,c}(i)$ is a PUSCH transmission BW in RBs in cell c and SF i.

$P_{O\_PUSCH,c}(j)$ controls a mean received SINR at eNB 102 in cell c and is the sum of a cell-specific component $P_{O\_NOMINAL\_PUSCH,c}(i)$ and a UE-specific component $P_{O\_UE\_PUSCH,c}(j)$ provided to UE 114 by eNB 102 through higher layer signaling. For semi-persistently scheduled (SPS) PUSCH (re)transmissions, j=0. For dynamically scheduled PUSCH (re)transmissions, j=1.

$PL_c$ is a path loss (PL) estimate measured by UE 114 for cell c (see also REF 3). For example, UE 114 can measure a path loss by using typical implementations to measure a reference signal received power (RSRP) and then compare the RSRP to a known RS transmission power than is informed to UE 114 from eNB 102 by higher layers, for example in a SIB.

For j=0 or j=1, $\alpha_c(j)=\{0, 0.4, 0.5, 0.60.7, 0.8, 0.9, 1\}$ is configured to UE 114 by eNB 102 through higher layer signaling. Fractional UL PC is obtained for $\alpha_c(j)<1$ as a PL is not fully compensated.

$\Delta_{TF,c}(i)$ is either equal to 0 or is determined by a spectral efficiency of a PUSCH transmission as $\Delta_{TF,c}(i)=10 \log_{10} ((2^{BPRE \cdot K_s}-1) \cdot \beta_{offset}^{PUSCH})$ where, $K_s$ is configured to UE 114 by higher layer signaling as either $K_s=0$ or $K_s=1.25$ and $BPRE=O_{CQI}/N_{RE}$ for A-CSI sent via PUSCH without UL-SCH data and $$\sum_{r=0}^{C-1} K_r / N_{RE}$$

for other cases where C is a number of code blocks, $K_r$ is a size for code block r, $O_{CQI}$ is a number of CQI/PMI bits including CRC bits and $N_{RE}$ is a number of REs determined as $N_{RE}=M_{sc}^{PUSCH-initial} \cdot N_{symb}^{PUSCH-initial}$, where C, $K_r$, $M_{sc}^{PUSCH-initial}$ and $N_{symb}^{PUSCH-initial}$ are defined in REF 2.

$\beta_{offset}^{PUSCH}=\beta_{offset}^{CQI}$ (see also REF 2) for A-CSI sent via PUSCH without UL-SCH data and 1 for other cases.

$f_c(i)=f_c(i-1)+\delta_{PUSCH,c}(i-K_{PUSCH})$ when accumulative CLPC is used, and $f_c(i)=\delta_{PUSCH,c}(i-K_{PUSCH})$ when absolute CLPC is used where $\delta_{PUSCH,c}(i-K_{PUSCH})$ is a TPC command included in a DCI format scheduling a PUSCH or included in a DCI format 3/3A. $K_{PUSCH}$ is derived from a timeline between a SF of a PDCCH transmission scheduling a PUSCH and a SF of a respective PUSCH transmission (see also REF 3).

A PUCCH transmission power $P_{PUCCH,c}(i)$ from UE 114 in cell c and SF i is given by Equation 2 (see also REF 3):

$$P_{PUCCH,c}(i) = \min\left\{\begin{array}{l} P_{CMAX,c}(i), \\ P_{O\_PUCCH,c}(j) + PL_c + h(n_{CQI}, n_{HARQ}, n_{SR}) + \\ \Delta_{F\_PUCCH}(F) + \Delta_{TxD}(F') + g(i) \end{array}\right\} [dBm] \quad (2)$$

where, $P_{CMAX,c}(i)$ is a configured UE 114 transmission power in cell c and SF i (see also REF 3).

$P_{O\_PUCCH,c}$ is a sum of a cell-specific parameter $P_{O\_NOMINAL\_PUCCH,c}$ and a UE-specific parameter $P_{O\_UE\_PUCCH,c}$ that are provided to UE 114 by higher layer signaling.

$PL_c$ is a path loss (PL) estimate measured by UE 114 for cell c (see also REF 3).

h(.) is a function with values depending on a format used for the PUCCH transmission, such as a PUCCH format 2 or a PUCCH format 3, and on whether HARQ-ACK, SR, or CSI is transmitted (see also REF 3).

$\Delta_{F\_PUCCH}(F)$ is provided to UE 114 by higher layers and its value depends on a respective PUCCH format (F) to offset a transmission power relative to PUCCH format 1a (see also REF 3).

$\Delta_{TxD}(F')$ is non-zero when a PUCCH format F' is transmitted from two or more antenna ports (otherwise, when PUCCH format F' is transmitted from one antenna port, $\Delta_{TxD}(F')$ is zero).

$g(i)=g(i-1)+\delta_{PUCCH}(i)$ is a function accumulating a TPC command $\delta_{PUCCH}(i)$ in a DCI format 3/3A or in a DCI format scheduling PDSCH reception and g(0) is a value after reset of accumulation.

One mechanism towards satisfying a demand for increased network capacity and data rates is network densification. This is realized by deploying small cells in order to increase a number of network nodes and their proximity to UEs and provide cell splitting gains. As a number of small cells increases and deployments of small cells become dense, a handover frequency and a handover failure rate can also significantly increase. By maintaining a RRC connection to the macro-cell, communication with the small cell can be optimized as control-place (C-place) functionalities such as mobility management, paging, and system information updates can be provided only by the macro-cell while a small-cell can be dedicated for user-data plane (U-plane) communications. When a latency of a backhaul link between network nodes (cells) is practically zero, Carrier Aggregation (CA) can be used as in REF 3 and scheduling decisions can be made by a same eNB 102 and conveyed to each network node. Moreover, UCI from UE 114 can be received at any network node, except possibly for nodes using unlicensed spectrum, and conveyed to eNB 102 to facilitate a proper scheduling decision for UE 114.

Figure 9:
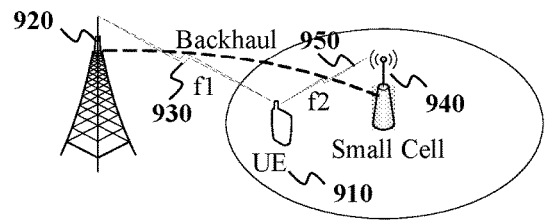
FIG. 9 illustrates a communication using CA according to this disclosure.

FIG. 9 illustrates a communication using CA according to this disclosure.

UE 114 910, communicates with a first cell 920 corresponding to a macro-cell using a first carrier frequency f1 930 and with a second cell 940 corresponding to a small cell over carrier frequency f2 950. The first carrier frequency can correspond to a licensed frequency band and the second carrier frequency can correspond to an unlicensed frequency bad. The first cell and the second cell are controlled by eNB 102 and are connected over a backhaul that introduces negligible latency.

When UE 114 is configured with CA operation with up to 5 DL cells, HARQ-ACK transmission on a PUCCH typically uses a PUCCH format 3 (see also REF 1 and REF 3). In a FDD system, a method for UE 114 to obtain a TPC command to adjust a power of a PUCCH format 3 transmission is from a TPC command field in a DCI format scheduling a PDSCH transmission on a primary cell (see also REF 2 and REF 3). A method for UE 114 to determine a resource to transmit the PUCCH format 3 is from a TPC command field in a DCI format scheduling a PDSCH transmission on a secondary cell (see also REF 3). Then, the TPC command field provides an acknowledgement resource indication (ARI) or, equivalently, a PUCCH resource index for one of four PUCCH resources configured to UE 114 by higher layers (see also REF 3). For example, for a TPC command field of 2 bits and UE 114 configured with 4 resources for PUCCH format 3 transmission, an ARI can indicate one of the 4 resources (see also REF 3).

For a TDD system, UE 114 uses a PUCCH format 3 resource determined from a TPC command field in a DCI format with DAI value greater than '1' or with DAI value equal to '1' that is not the first DCI format that UE 114 detects within a bundling window. UE 114 assumes that a same PUCCH resource index value is transmitted in all DCI formats used to determine the PUCCH resource index value for a bundling window (see also REF 3). A functionality of a TPC command field in a DCI format with DAI value equal to '1' that is the first DCI format UE 114 detects in a bundling window remains unchanged and provides a TPC command value for UE 114 to adjust a transmission power for the PUCCH format 3. In this manner, a DAI field functions both as a counter of DL DCI formats transmitted to UE 114 within a bundling window and as an indicator whether a TPC command field in a DCI format provides a TPC command value or whether a TPC command field in a DCI format provides an indicator to one PUCCH resource from a set of PUCCH resources configured to UE 114 (ARI).

When a DCI format is conveyed by an EPDCCH, the DCI format also includes a HARQ-ACK resource offset (HRO) field that either indicates a PUCCH resource for a PUCCH format 1a/1b transmission when the DCI format schedules PDSCH on a primary cell or is set to zero when the DCI format schedules PDSCH on a secondary cell (see also REF 2 and REF 3). Therefore, regardless of whether a DCI format scheduling a PDSCH transmission is conveyed by a PDCCH or an EPDCCH, UE 114 cannot obtain a TPC command to transmit associated HARQ-ACK information in a PUCCH when UE 114 does not detect a DCI format scheduling a PDSCH transmission on a primary cell.

Typical CA operation supports up to 5 DL cells each with a maximum of 20 MHz BW and, for UL/DL configuration 5 in TDD systems, for up to 2 DL cells (see also REF 3). This limitation on the number of DL cells that UE 114 can support limits DL data rates due to a respective limitation in a total DL BW. With an availability of unlicensed spectrum where many 20 MHz BW carriers can exist, a number of cells that can be configured to UE 114 can become significantly larger than 5. Therefore, extending support for CA beyond 5 DL cells can allow for more efficient utilization of available spectrum and improve DL data rates and service experience for UE 114. A consequence from increasing a number of DL cells relates to a need to support larger UCI payloads. A new PUCCH format that can accommodate large HARQ-ACK payloads or, in general, large UCI payloads can have a PUSCH-based structure (see also REF 5) and use TBCC or TC to encode UCI. Achieving a desired detection reliability of a HARQ-ACK codeword or, in general, of a UCI codeword can become more difficult as a respective payload increases and it can be beneficial to improve transmission power control for a respective PUCCH format and improve a detection performance for a TBCC decoder or a TC decoder.

Embodiments of this disclosure provide mechanisms to increase a probability that a UE obtains TPC commands for transmission of a PUCCH format conveying HARQ-ACK information. Embodiments of this disclosure also provide mechanisms for a base station to indicate and for a UE to determine a resource for a PUCCH format transmission. Embodiments of this disclosure additionally provide mechanisms for a UE to determine a power for a PUCCH transmission. Embodiments of this disclosure additionally provide mechanisms for a base station to improve a detection reliability of a TBCC encoded HARQ-ACK codeword by utilizing known values in the HARQ-ACK codeword.

In the following, for brevity, a SPS PDSCH transmission or a DCI format indicating SPS PDSCH release is not explicitly mentioned; UE 114 is always assumed to include HARQ-ACK information for SPS PDSCH transmission or for a DCI format indicating SPS PDSCH release (see also REF 3). Further, unless explicitly otherwise mentioned, a DCI format is assumed to schedule a PDSCH transmission (or SPS PDSCH release) in a respective cell. Further, UE 114 is configured a group of cells for possible receptions of respective PDSCH transmissions for operation with carrier aggregation. Each cell in the group of cells is identified by a UE-specific cell index that eNB 102 can inform UE 114 through higher layer signaling. UE 114 is configured to transmit HARQ-ACK information in a same PUCCH in response to PDSCH receptions in any cells from the group of cells. For example, UE 114 can be configured with a group of C cells and respective cell indexes 0, 1, . . . , C–1.

When UE 114 is configured a parameter by eNB 102, unless otherwise noted, the configuration is by higher layer signaling, such as RRC signaling, while when a parameter is dynamically indicated to UE 114 by eNB 102, the indication is by physical layer signaling such as by a DCI format transmitted in a PDCCH or EPDCCH. UE 114 can be configured with more than one UL cell for PUCCH transmission, such as for example two UL cells. PUCCH transmission in a first UL cell is associated with a first group of DL cells and PUCCH transmission in a second UL cell is associated with a second group of DL cells. UE 114 is assumed to transmit a PUCCH on a primary cell. UE 114 can also be configured by eNB 102 to transmit PUCCH on a primary secondary cell. In such case, UE 114 transmits PUCCH on the primary for UCI corresponding to a first group of DL cells (CG1) and transmits PUCCH on the primary secondary cell for UCI corresponding to a second group of DL cells (CG2). Unless otherwise explicitly noted, the descriptions in this disclosure are with respect to one group of DL cells and can be replicated for another group of DL cells.

Transmission Power Control Commands

A first embodiment of this disclosure considers power adjustments and resource determination for transmission of HARQ-ACK information in a PUCCH. Unless explicitly otherwise mentioned, a DCI format is assumed to schedule a PDSCH transmission in a respective cell. For brevity, a SPS PDSCH transmission or a DCI format indicating SPS PDSCH release is not explicitly mentioned; UE 114 is always assumed to include HARQ-ACK information for SPS PDSCH transmission or for a DCI format indicating SPS PDSCH release.

UE 114 can determine a number of DCI formats with associated HARQ-ACK information in a same PUCCH transmission based on a counter DAI field and a total DAI field (see also in REF 6). The counter DAI in a DCI format transmitted in a SF is an incremental counter (modulo 4) of DCI formats up to the DCI format in the SF with associated HARQ-ACK information in a same PUCCH transmission. The total DAI in a DCI format transmitted in a SF is a total counter (modulo 4) of DCI formats up to the SF with associated HARQ-ACK information in a same PUCCH transmission.

In a first example for a FDD system, a method for providing TPC commands to UE 114 for adjusting a power of a PUCCH format transmission can depend on a number of DCI formats transmitted to the UE in a SF.

In a first method, a process for determining a TPC command to adjust a power of a PUCCH format transmission and for determining a PUCCH resource for the PUCCH format transmission depends on a number of transmitted DCI formats by eNB 102 or identified DCI formats by UE 114. For a FDD system, when eNB 102 transmits a first number of DCI formats scheduling respective PDSCH transmissions in a first number of cells to UE 114, eNB 102 can use the TPC command field to provide a TPC command only in a DCI format for a primary cell and use the TPC command field in any DCI format for a respective secondary cell to provide an ARI for a PUCCH resource determination to UE 114. When, through a total DAI field, UE 114 determines (but not necessarily detects) a first number of DCI formats for a first number of cells, UE 114 can use a TPC command field only in a DCI format for a primary cell to obtain TPC command for a PUCCH transmission conveying HARQ-ACK and use a TPC command field in any DCI format for a respective secondary cell to obtain ARI for a PUCCH resource determination. When eNB 102 transmits a second number of DCI formats for a second number of cells, eNB 102 can use a TPC command field in a DCI format for a primary cell and in one or more DCI formats for respective one or more secondary cells to provide a TPC command and use a TPC command field in remaining DCI formats for respective secondary cells to provide ARI for a PUCCH resource determination to UE 114. When, through a total DAI field, UE 114 determines (but not necessarily detects) a second number of DCI formats for a second number of respective cells, UE 114 can use each respective TPC command field in a DCI format for a primary cell and in one or more DCI formats for respective secondary cells to obtain TPC command and use a TPC command field in each remaining DCI formats for respective secondary cells to obtain ARI for a PUCCH resource determination.

Figure 10:
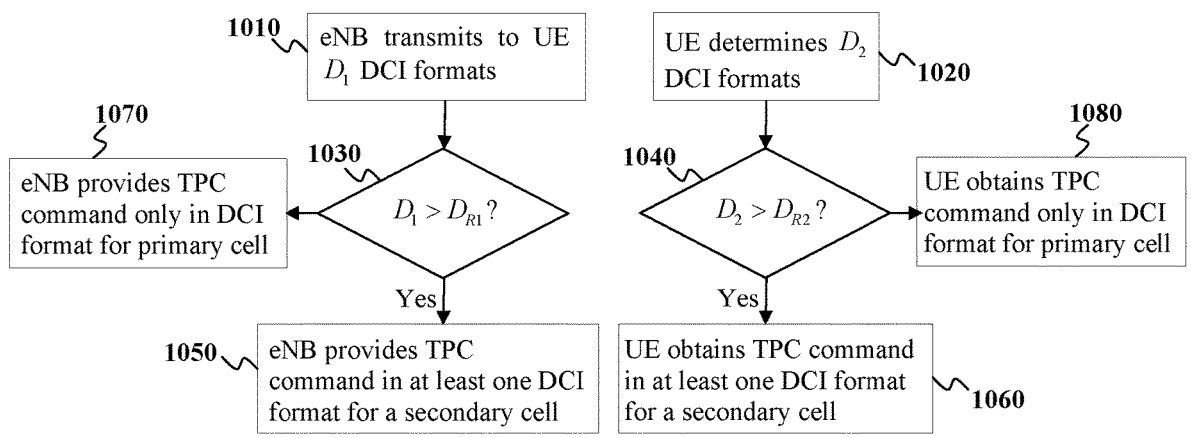
FIG. 10 illustrates a use of a TPC command field in a DCI format depending on a number of DCI formats an eNB transmits to a UE according to this disclosure.

FIG. 10 illustrates a use of a TPC command field in a DCI format depending on a number of DCI formats an eNB transmits to a UE according to this disclosure.

The eNB 102 transmits to UE 114 a first number $D_1$ of DCI formats scheduling respective PDSCH transmissions in respective cells in a SF 1010. UE 114 determines transmission of a second number $D_2$ of DCI formats scheduling PDSCHs in respective cells in the SF 1020. In absence of operating errors (DCI format detection errors), $D_1=D_2$. The second number of DCI formats that UE 114 determines that eNB 102 transmits to UE 114 in the SF is not necessarily same as a number of DCI formats UE 114 detects in the SF as, based on a use of a total DAI field, UE 114 can determine transmission of DCI formats that UE 114 failed to detect. The eNB 102 examines whether $D_1$ is larger than a first predetermined number $D_{R1}$ of DCI formats 1030. UE 114 examines whether $D_2$ is larger than a second predetermined number $D_{R2}$ of DCI formats 1040. When $D_1>D_{R1}$, eNB 102 provides TPC command in the TPC command field of at least one DCI format for a secondary cell 1050. When $D_2>D_{R2}$, UE 114 processes as a TPC command a value of a TPC command field of at least one DCI format for a secondary cell 1060. When $D_1 \leq D_{R1}$, eNB 102 provides only ARI in the TPC command field of each DCI format for a secondary cell 1070. When $D_2 \leq D_{R2}$, UE 114 processes only as ARI a value of the TPC command field of each DCI format for a secondary cell 1080.

In a second method, a process for determining a TPC command to adjust a power of a PUCCH format transmission and for determining a PUCCH resource for the PUCCH format transmission depends on the associated PUCCH format. For example, when UE 114 uses a first PUCCH format to transmit HARQ-ACK information, such as a PUCCH format 3 with transmission in one PRB pair, UE 114 can obtain a TPC command for adjusting a transmission power for the first PUCCH format only from the TPC command field in a DCI format for the primary cell and obtain an ARI for determining a resource for the first PUCCH format transmission from the TPC command field for any DCI format for a respective secondary cell. When UE 114 uses a second PUCCH format to transmit HARQ-ACK information, such as a PUCCH format with a PUSCH-based structure, UE 114 can obtain a TPC command for adjusting a transmission power for the second PUCCH format from the TPC command field in a DCI format for the primary cell and from the TPC command filed in some DCI formats for respective secondary cells and obtain an ARI for determining a resource for the second PUCCH format transmissions from the TPC command field in other DCI formats for respective secondary cells. A corresponding functionality can apply for eNB 102.

Figure 11:
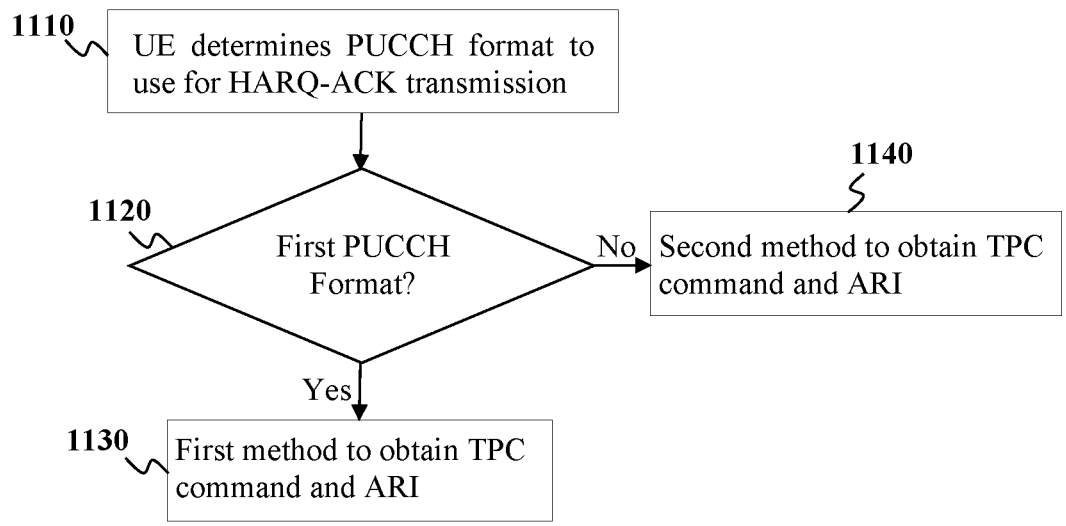
FIG. 11 illustrates a use a TPC command field in a DCI format according to a PUCCH format used by a UE to transmit HARQ-ACK information according to this disclosure.

FIG. 11 illustrates a use a TPC command field in a DCI format according to a PUCCH format used by a UE to transmit HARQ-ACK information according to this disclosure.

UE 114 determines a PUCCH format to use for HARQ-ACK transmission 1110. For example, the PUCCH format can be PUCCH format 3 with transmission in one PRB pair, or a PUCCH format based on the PUSCH structure. UE 114 determines whether the PUCCH format is a first PUCCH format, such as PUCCH format 3 with transmission in one PRB pair 1120. When the PUCCH format is the first PUCCH format, UE 114 uses a first method to obtain a TPC command and ARI 1130. When the PUCCH format is a second PUCCH format, UE 114 uses a second method to obtain a TPC command and ARI 1140. Similar steps apply when UE 114 considers whether a determined number of DCI formats scheduling PDSCH transmissions in respective cells is larger than a first number and when so, UE 114 uses a first method to obtain a TPC command and ARI; otherwise, UE 114 uses a second method to obtain a TPC command and ARI.

Different UL power control processes can be associated with respective different PUCCH formats and a TPC command for a transmission of a PUCCH format can either apply to a respective UL PC process or be common for all UL power control processes.

In case TPC commands or ARI is provided by one or more DCI formats for respective one or more secondary cells, several approaches can apply for a selection of the one or more DCI formats.

In a first approach, DCI formats can alternate in providing TPC commands or ARI where an ordering can be in an ascending order of a cell index with a respective PDSCH transmission. For example, when four DCI formats schedule respective four PDSCH transmissions in cells with indexes $c_1$, $c_2$, $c_3$, and $c_4$ where $c_1 < c_2 < c_3 < c_4$, a TPC command field in DCI formats for cells with indexes $c_1$ and $c_3$ can provide TPC commands while a TPC command field in DCI formats scheduling PDSCH transmissions in cells with indexes $c_2$ and $c_4$ can provide ARI. The first approach can be beneficial when cell indexing is such that UE 114 can experience similar channel conditions in cells with successive indexes, such as for example a similar propagation loss, a similar interference, or a similar availability of cells for PDSCH transmissions. Then, by alternating cell indexes where a TPC command field in a respective DCI format provides an actual TPC command or an ARI, a likelihood that UE 114 can detect at least two DCI formats providing a TPC command and an ARI, respectively, can increase.

In a second approach, when $N_c$ DCI formats are transmitted by eNB 102 or determined by UE 114 for scheduling PDSCH transmissions in respective $N_c$ cells, a first number of DCI formats, such as for example the first $\lceil N_c/2 \rceil$ (or $\lfloor N_c/2 \rfloor$) DCI formats or the first 4 DCI formats, after the first DCI format, can provide ARI and remaining DCI formats, such as the last $\lfloor N_c/2 \rfloor$ (or $\lceil N_c/2 \rceil$) DCI formats or the $N_c-4$ DCI formats (when $N_c > 4$), respectively, can provide TPC commands where $\lceil \; \rceil$ is a ceiling function rounding a number to the smallest integer that is larger than the number and $\lfloor \; \rfloor$ is a floor function rounding a number to the largest integer that is smaller than the number. Both approaches can be conditioned on a TPC command field in a DCI format for the primary cell to provide a TPC command (instead of ARI).

By using the second approach when a number of DCI formats (transmitted by eNB 102 and determined by UE 114) is large, so that for example UE 114 uses a second PUCCH format associated with transmission of DCI formats for a large number of cells, even when UE 114 fails to detect some DCI formats, a probability that UE 114 fails to detect all DCI formats providing TPC commands or all DCI formats providing ARI can be sufficiently lower than a probability of incorrect HARQ-ACK detection. Moreover, any approach can be conditioned so that a DCI format for a primary cell provides a TPC command for the PUCCH format transmission. Therefore, the application of the first method or the second method can also be associated with a use of a first PUCCH format or of a second PUCCH format, respectively.

Figure 12:
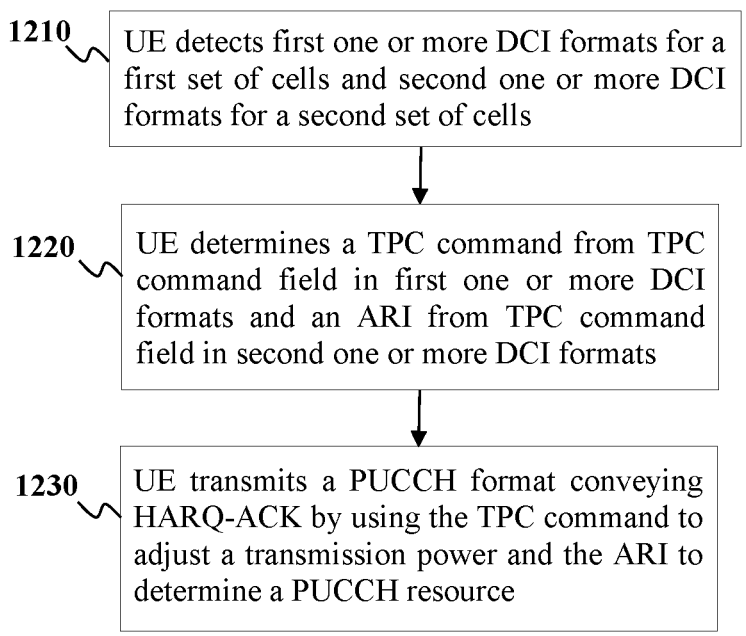
FIG. 12 illustrates a mechanism for providing a TPC command and an ARI for a PUCCH transmission conveying HARQ-ACK information according to this disclosure.

FIG. 12 illustrates a mechanism for providing a TPC command and an ARI for a PUCCH transmission conveying HARQ-ACK information according to this disclosure.

UE 114 configured for CA operation detects first one or more DCI formats that schedule respective PDSCH transmissions in a first set of cells and second one or more DCI formats that schedule respective PDSCH transmissions in a second set of cells 1210. UE 114 determines a TPC command from TPC command field in the first one or more DCI formats and an ARI from a TPC command field in the second one or more DCI formats 1220. UE 114 transmits a PUCCH format conveying HARQ-ACK information by using the TPC command to adjust a transmission power and the ARI to determine a PUCCH resource 1230. Similar, eNB 102 transmits third one or more DCI formats that schedule PDSCH in a first set of cells and fourth one or more DCI format that schedule PDSCH in a second set of cells. The eNB 102 provides TPC command in the TPC command field in the first one or more DCI formats and ARI in the TPC command field in the second one or more DCI formats. The first one or more DCI formats or the third one or more DCI formats include at least one DCI format scheduling a respective at least one PDSCH transmission in respective at least one secondary cell.

In a second example, a TPC command field can always be used to provide TPC commands and an additional field can be included to provide ARI. For DCI formats transmitted by PDCCH, this additional field needs to be introduced as a new field. For DCI formats transmitted by EPDCCH, this additional field can be the HRO field when a DCI format schedules a PDSCH transmission in a secondary cell. Then, instead of the HRO field value being set to zero as for conventional operation (see also REF 3), the HRO field is used as an ARI field.

Any of the two examples can also apply for a TDD system with an additional condition that applicability extends in every SF of a bundling window where eNB 102 transmits DCI formats to UE 114. For the first method, in order to account for a likelihood that UE 114 experiences correlated channel conditions in SFs of a same bundling window and a likelihood that UE 114 is scheduled PDSCH transmissions in a same cell in multiple SFs of a same bundling window, a DCI format association for a TPC command field to a TPC command or to an ARI can alternate between successive SFs of a same bundling window. A primary cell can be excluded from this alternate association. For example, for the first approach, a TPC command field in a first, third, fifth, and so on, DCI formats can provide a TPC command and a TPC command field in a second, fourth, sixth, and so on DCI formats can provide an ARI in a first SF and the association can be reversed in a second SF of a same bundling window. Moreover, UE 114 can accumulate TPC commands in SFs of a bundling window having a number of $M_W$ SFs. When $\delta_{PUCCH}(j)$ is a TPC command value in DCI formats for applicable cells in SF j, j=0, 1, . . . , $M_W-1$, UE 114 can compute a final TPC command for adjusting a PUCCH transmission power as $$\sum_{j=0}^{M_W-1} \delta_{PUCCH}(j).$$

This can provide more accurate power control, particularly in association with a PUCCH format used for transmission of large HARQ-ACK payloads.

For a TDD system, the eNB 102 scheduler cannot be generally assumed to be capable of predicting scheduling decisions for PDSCH transmissions to UE 114 in future SFs of a same bundling window. Consequently, when UE 114 selects a PUCCH format according to a respective HARQ-ACK information payload, the eNB 102 scheduler cannot be generally assumed to know the PUCCH format at the first SF of the bundling window because the eNB 102 scheduler cannot know, in general, the HARQ-ACK information payload after the last SF of the bundling window. For example, when eNB 102 schedules PDSCH transmissions to UE 114 only in the first SF of a bundling window, UE 114 uses a first PUCCH format such as PUCCH format 3, while when 102 eNB schedules PDSCH transmissions to UE 114 in all SFs of the bundling window, UE 114 uses a second PUCCH format such as a PUCCH format having a PUSCH-based structure, for example as in FIG. 4. For a FDD system, unlike a TDD system, an eNB 102 scheduler knows a number of cells with PDSCH transmissions in a SF and can set an ARI value to either indicate a resource for a PUCCH format 3 when a corresponding HARQ-ACK payload is $O_{HARQ-ACK} \leq 22$ bits or indicate a resource for a PUSCH-based PUCCH format when a corresponding HARQ-ACK payload is $O_{HARQ-ACK} > 22$ bits.

In order to enable eNB 102 and UE 114 to have a same understanding of a PUCCH resource for a transmission of a PUCCH format, an ARI value in a DCI format transmitted in a SF of a bundling window can indicate a resource for a PUCCH format that UE 114 would use in response to PDSCH receptions in previous SFs, when any, of the bundling window and in the SF of the bundling window. Therefore, the ARI value can depend on the SF of a respective DCI format transmission and can be different in DCI formats transmitted in different SFs of a bundling window. For example, a DCI format scheduling a PDSCH transmission in a first SF of a bundling window indicates (through a value of a TPC command field when it serves as an ARI field) a PUCCH resource for a first PUCCH format, such as PUCCH format 3, while a DCI format scheduling a PDSCH transmission in a last SF of the bundling window indicates a PUCCH resource for a second PUCCH format, such as a PUCCH format 4 having a PUSCH-based structure.

Figure 13:
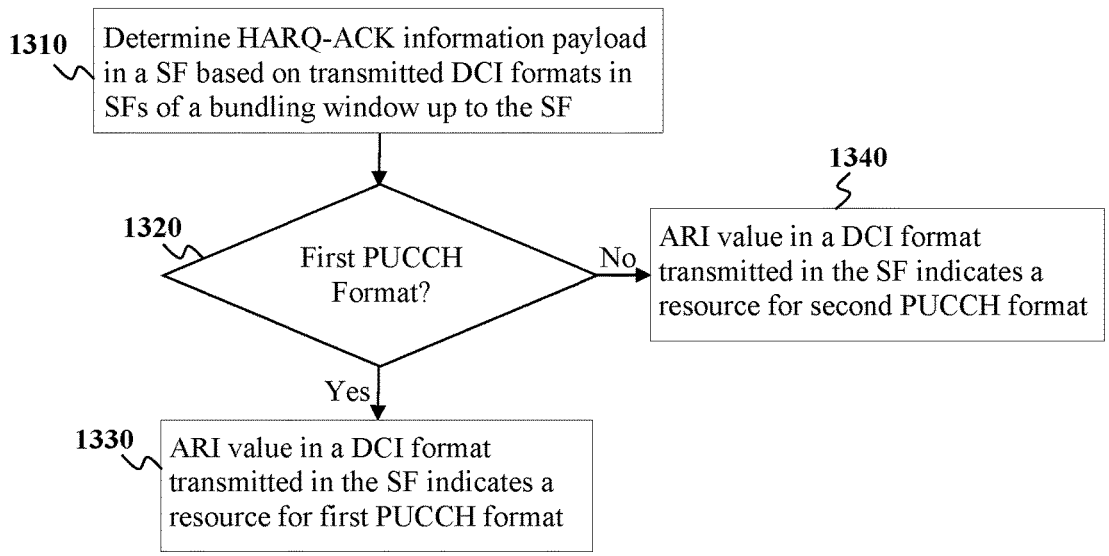
FIG. 13 illustrates a determination by an eNB and by a UE of a PUCCH resource indicated by an ARI value in a DCI format transmitted in a SF of a bundling window according to this disclosure.

FIG. 13 illustrates a determination by an eNB and by a UE of a PUCCH resource indicated by an ARI value in a DCI format transmitted in a SF of a bundling window according to this disclosure.

In a SF, eNB 102 (or UE 114) determines a HARQ-ACK information payload based on transmitted DCI formats in SFs of a bundling window up to the SF 1310. The eNB 102 (or UE 114) determines whether the HARQ-ACK information payload is associated with use of a first PUCCH format or of a second PUCCH format 1320. When the first PUCCH format is used, an ARI value in a DCI format transmitted in SF 1310 indicates a resource for the first PUCCH format transmission 1330. When the second PUCCH format is used, the ARI value in the DCI format transmitted in SF 1310 indicates a resource for the second PUCCH format transmission 1340.

When UE 114 transmits PUCCH on the primary cell for UCI corresponding to a first group of DL cells and transmits PUCCH on a primary secondary cell for UCI corresponding to a second group of DL cells, the first embodiment separately applies for the first group of DL cells and the primary cell and for the second group of DL cells and the primary secondary cell.

PUCCH Transmission Power Control

A second embodiment of this disclosure considers a power control mechanism for a PUCCH transmission. Unlike PUCCH formats supported for CA with up to 5 DL cells (see also REF 1 and REF 3) where PUCCH transmission is always over one PRB pair, PUCCH transmission for CA with more than 5 DL cells can be in more than one PRB pair.

For HARQ-ACK transmission in a PUCCH, UE 114 can derive a PUCCH transmission power $P_{PUCCH,c}(i)$, in decibels per milliwatt (dBm), in cell c (primary cell or primary secondary cell) and SF i as in Equation 3):

$$P_{PUCCH,c}(i) = \min \left\{ \begin{array}{l} P_{CMAX,c}(i), \\ 10\log_{10}(M_{PUCCH,c}(i)) + P_{O\_PUCCH,c}(u) + \\ PL_c + \Delta_{TF,c}(i) + \Delta_{TxD}(u) + g_c(i) \end{array} \right\} \quad [dBm] \quad (3)$$

or equivalently, using a $\Delta_{F\_PUCCH}(F)$ offset relative to PUCCH format 1a as in Equation 2 for a PUCCH transmission power, as in Equation 3a:

$$P_{PUCCH,c}(i) = \quad (3a)$$
$$\min \left\{ \begin{array}{l} P_{CMAX,c}(i), \\ 10\log_{10}(M_{PUCCH,c}(i)) + P_{O\_PUCCH,c}(u) + \\ PL_c + \Delta_{TF,c}(i) + \Delta_{F\_PUCCH}(F) + \Delta_{TxD}(u) + g_c(i) \end{array} \right\} \quad [dBm]$$

where, $P_{CMAX,c}(i)$ is a configured UE 114 transmission power in cell c and SF i, $M_{PUCCH,c}(i)$ is a PUCCH transmission BW in RBs in cell c and SF i, $P_{O\_PUCCH,c}(u)$ controls a mean received SINR at eNB 102 in cell c and is a sum of a cell-specific component $P_{O\_NOMINAL\_PUCCH}(u)$ and a UE-specific component $P_{O\_UE\_PUCCH}(u)$ configured to UE 114 by eNB 102 through higher layer signaling. For a PUCCH transmission conveying HARQ-ACK, u=0. For a PUCCH transmission conveying P-CSI, u=1. For a PUCCH transmission conveying both HARQ-ACK and P-CSI, a larger of the two $P_{O\_NOMINAL\_PUCCH}(u)$ values applies in order to ensure the smaller target BLER between HARQ-ACK BLER and P-CSI BLER for the joint HARQ-ACK and P-CSI transmission. SR transmission can be incorporated without additional changes. When a same target BLER applies by default for HARQ-ACK and P-CSI in a system operation (that is, different $P_{O\_PUCCH,c}(u)$ values for HARQ-ACK and P-CSI are not configured to UE 114 by eNB 102), a dependence of $P_{O\_PUCCH,c}(u)$ on UCI type is not needed (the index u can be omitted).

$PL_c$ is a PL estimate measured by UE 114 for cell c.

$\Delta_{F\_PUCCH}(F)$ is provided to UE 114 by higher layers and its value depends on a respective PUCCH format (F) to offset a transmission power relative to PUCCH format 1a.

$\Delta_{TF,c}(i)$ is determined as $\Delta_{TF,c}(i)=10 \log_{10}(2^{BPRE \cdot K_s}-1)$ where BPRE=$O_{UCI}/N_{RE}$, $O_{UCI}$ is a number of UCI bits including CRC bits, and $N_{RE}=M_{sc}^{PUCCH} \cdot N_{symb}^{PUCCH}$. In a first example, $K_s$ is configured to UE 114 by higher layer signaling as either $K_s=0$ or $K_s=1.25$. In a second example, the value of $K_s$ is set by the specification of the system operation as $K_s=1.25$ in order to adjust a PUCCH transmission power according to a UCI payload.

for the current PUCCH power control adjustment state, $g_c(i)$:

$$g_c(i) = g_c(i-1) + \sum_{m=0}^{M-1} \delta_{PUCCH,c}(i-k_m)$$

where g(0) is the first value after reset, $\delta_{PUCCH,c}$ is the TPC command signaled to UE 114 in a DL DCI format scheduling PDSCH, such as the (first, in case of a TDD system) DCI format scheduling PDSCH on the primary cell or a DCI format 3/3A, and the definition of M and $k_m$ is as in REF 3.

$\Delta_{TxD}(u)$ is equal to 0 when UE 114 transmits a PUCCH from a single antenna port and $\Delta_{TxD}(u) > 0$ when UE 114 is configured by eNB 102 to transmit a PUCCH using transmitter antenna diversity (TxD). A negative $\Delta_{TxD}(u)$ value captures a BLER gain due to transmitter antenna diversity. When UE 114 is independently configured TxD for HARQ-ACK transmission and for P-CSI transmission, $\Delta_{TxD}(u)$ can be different for HARQ-ACK transmission (captured by u=0) and for P-CSI transmission (captured by u=1). For a PUCCH transmission conveying both HARQ-ACK and P-CSI, TxD can be used. When UE 114 is jointly configured TxD for HARQ-ACK transmission and for P-CSI transmission, a dependence of $\Delta_{TxD}(u)$ on UCI type is not needed (the index u can be omitted).

HARQ-ACK Information Codeword Detection at an eNB Receiver

A third embodiment of this disclosure considers a detection procedure of a HARQ-ACK information codeword at eNB 102 when UE 114 encodes the HARQ-ACK codeword using TBCC.

An HARQ-ACK information codeword can include HARQ-ACK values that are known to eNB 102. For example, when a cell-domain total DAI is not used to indicate cells with PDSCH transmissions to UE 114 from eNB 102 in a FDD system for determining an HARQ-ACK payload, UE 114 can include HARQ-ACK information for all configured cells in a HARQ-ACK information codeword. For cells where eNB 102 does not transmit a PDSCH to UE 114, eNB 102 can expect that a respective HARQ-ACK value in the HARQ-ACK information codeword is a NACK/DTX value. For example, for a TDD system, when UE 114 provides HARQ-ACK information for PDSCH transmissions in a cell for every SF in a bundling window, eNB 102 can expect that in a SF where eNB 102 does not transmit PDSCH to UE 114, a respective HARQ-ACK value in the HARQ-ACK information codeword is a NACK/DTX value. A NACK/DTX value can be represented, for example, by a binary '0' while an ACK value can be represented by a binary '1'.

When UE 114 uses TBCC for a HARQ-ACK information codeword, a TBCC decoder at eNB 102 can maintain a number of paths through a trellis where the paths can be selected according to respective likelihood metrics. A path with a largest likelihood metric can be discarded (respective branch in a trellis is pruned) when a resulting HARQ-ACK information codeword contains different values for HARQ-ACK information that is known in advance to eNB 102, the path with the next largest likelihood metric can be selected, and so on, until a resulting decoded HARQ-ACK information codeword contains same values for HARQ-ACK information as the ones that are known in advance to eNB 102. For example, considering for simplicity a HARQ-ACK information codeword of 5 bits (although in practice convolutional encoding applies to HARQ-ACK codewords of significantly larger size, such as above 22 bits), where eNB 102 expects a fourth bit to have a value of '0', eNB 102 can discard a decoded codeword of 'x1, x2, x3, 1, x5' even when this codeword has a largest likelihood metric and instead select a codeword of 'y1, y2, y3, 0, y5' that has a largest likelihood metric among codewords having a '0' binary value for their fourth element.

Figure 14:
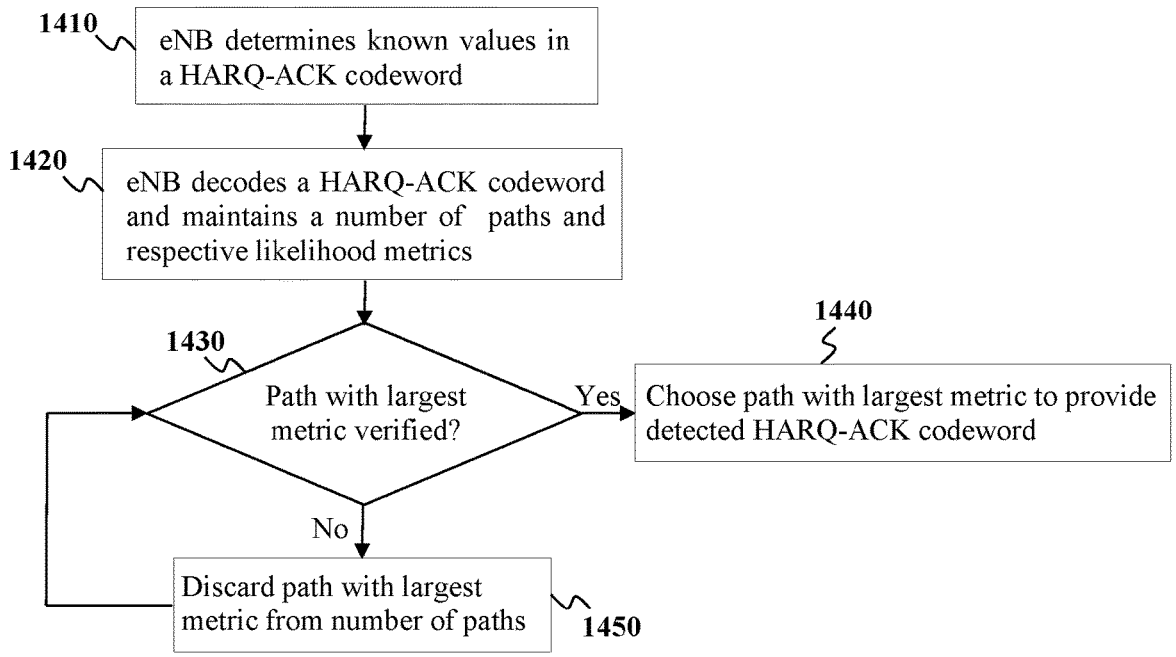
FIG. 14 illustrates a decoding process at an eNB for a TBCC encoded HARQ-ACK information codeword according to this disclosure.

FIG. 14 illustrates a decoding process at an eNB for a TBCC encoded HARQ-ACK information codeword according to this disclosure.

The eNB 102 determines known values in a received, TBCC encoded, HARQ-ACK codeword 1410 that is transmitted by UE 114 in response to receptions of PDSCH transmissions. For example, a known value can be a binary '0' at a position corresponding to a cell where eNB 102 does not transmit PDSCH in a SF. A TBCC decoder at eNB 102 decodes the TBCC encoded HARQ-ACK codeword and maintains a number of paths through a decoding trellis and respective likelihood metrics 1420. The number of paths can depend on the eNB 102 decoder implementation. The eNB 102 determines whether or not a HARQ-ACK codeword corresponding to a path with a largest metric is verified 1430. Verification can be by determining whether or not the known values for a candidate HARQ-ACK codeword corresponding to the path with the largest metric are same with the values of the decoded HARQ-ACK codeword at respective predetermined locations that can correspond, for example, to cell indexes. When verification is positive, eNB 102 can select the candidate HARQ-ACK codeword as the one corresponding to the path with the largest metric 1440. When verification is negative, eNB 102 can discard a current path with a largest metric from the number of paths 1450 and then repeat step 1430. Equivalently, the eNB 102 TBCC decoder can prune branches in the trellis that correspond to a different HARQ-ACK information bit value than a known HARQ-ACK information bit value at a respective position in the HARQ-ACK codeword.

Figure 15:
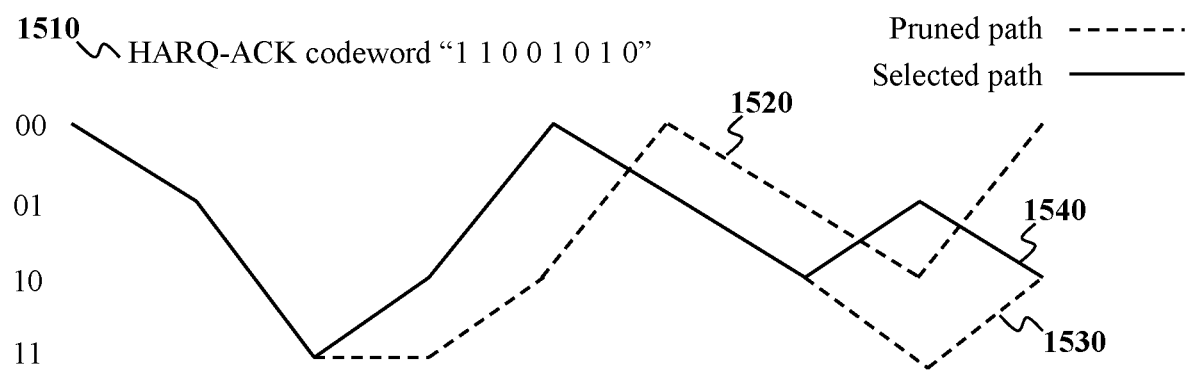
FIG. 15 illustrates a path selection by a decoder using knowledge of known bits in a codeword according to this disclosure.

FIG. 15 illustrates a path selection by a decoder using knowledge of known bits in a codeword according to this disclosure.

An actual HARQ-ACK codeword is "1 1 0 0 1 0 1 0" 1510. Known HARQ-ACK information bits are the third one and the sixth one. Using this knowledge, a decoder prunes (discards) paths in the trellis 1520, 1530 that, although have larger likelihood metrics, result to a decoded codeword with different values for the HARQ-ACK information bits than the known ones. The decoder selects the path with the largest likelihood metric that results to a codeword with same HARQ-ACK information bit values as the known ones at the respective locations of the HARQ-ACK codeword 1540.

Although the present disclosure has been described with example embodiments, various changes and modifications may be suggested to one skilled in the art. It is intended that the present disclosure encompass such changes and modifications that fall within the scope of the appended claims.

What is claimed is:

1. A user equipment (UE), comprising:
   a receiver configured to receive a number of physical downlink control channels (PDCCHs) that include downlink control information (DCI) formats scheduling receptions of physical downlink shared channels (PDSCHs) that include transport blocks (TBs); and
   a transmitter configured to transmit a physical uplink control channel (PUCCH) that includes a number of hybrid automatic repeat request acknowledgement (HARQ-ACK) information bits in response to the receptions of the TBs in the PDSCHs, wherein a resource for the PUCCH transmission is determined from a field in a DCI format in a last PDCCH reception,
   wherein the PDCCH receptions are ordered in an ascending order of respective starting reception times.

2. The UE of claim 1, wherein
the field in the DCI format included in the last PDCCH reception indicates a resource from a set of resources, and
the set of resources is determined from the number of HARQ-ACK information bits.

3. The UE of claim 1, wherein the PDCCH receptions are ordered in an ascending order of cell indexes of PDSCH receptions scheduled by the DCI formats.

4. The UE of claim 1, wherein:
the field in a DCI format other than the DCI format in the last PDCCH reception indicates a first resource, and
the field in the DCI format in the last PDCCH reception indicates a second resource that is different from the first resource.

5. The UE of claim 4, wherein the first resource is associated with use of a first PUCCH format and the second resource is associated with use of a second PUCCH format that is different from the first PUCCH format.

6. The UE of claim 4, wherein:
the first resource is associated with a first maximum number of HARQ-ACK information bits and the second resource is associated with a second maximum number of HARQ-ACK information bits, and
the first maximum number is smaller than the second maximum number.

7. A base station, comprising:
a transmitter configured to transmit a number of physical downlink control channels (PDCCHs) that include downlink control information (DCI) formats scheduling transmissions of physical downlink shared channels (PDSCHs) that include transport blocks (TBs); and
a receiver configured to receive a physical uplink control channel (PUCCH) that includes a number of hybrid automatic repeat request acknowledgement (HARQ-ACK) information bits in response to the transmissions of the TBs in the PDSCHs, wherein a resource for the PUCCH reception is determined from a field in a DCI format in a last PDCCH transmission,
wherein the PDCCH transmission are ordered in an ascending order of respective starting transmission times.

8. The base station of claim 7, wherein
the field in the DCI format included in the last PDCCH transmission indicates a resource from a set of resources, and
the set of resources is determined from the number of HARQ-ACK information bits.

9. The base station of claim 7, wherein the PDCCH transmissions are ordered in an ascending order of cell indexes of PDSCH transmissions scheduled by the DCI formats.

10. The base station of claim 7, wherein:
the field in a DCI format other than the DCI format in the last PDCCH transmission indicates a first resource, and
the field in the DCI format in the last PDCCH transmission indicates a second resource that is different from the first resource.

11. The base station of claim 10, wherein the first resource is associated with use of a first PUCCH format and the second resource is associated with use of a second PUCCH format that is different from the first PUCCH format.

12. The base station of claim 10, wherein:
the first resource is associated with a first maximum number of HARQ-ACK information bits and the second resource is associated with a second maximum number of HARQ-ACK information bits, and
the first maximum number is smaller than the second maximum number.

13. A method, comprising:
receiving a number of physical downlink control channels (PDCCHs) that include downlink control information (DCI) formats scheduling receptions of physical downlink shared channels (PDSCHs) that include transport blocks (TBs); and
transmitting a physical uplink control channel (PUCCH) that includes a number of hybrid automatic repeat request acknowledgement (HARQ-ACK) information bits in response to the receptions of the TBs in the PDSCHs, wherein a resource for the PUCCH transmission is determined from a field in a DCI format in a last PDCCH reception,
wherein the PDCCH receptions are ordered in an ascending order of respective starting reception times.

14. The method of claim 13, wherein
the field in the DCI format included in the last PDCCH reception indicates a resource from a set of resources, and
the set of resources is determined from the number of HARQ-ACK information bits.

15. The method of claim 13, wherein:
the field in a DCI format other than the DCI format in the last PDCCH reception indicates a first resource, and
the field in the DCI format in the last PDCCH reception indicates a second resource that is different from the first resource.

16. The method of claim 15, wherein the first resource is associated with use of a first PUCCH format and the second resource is associated with use of a second PUCCH format that is different from the first PUCCH format.

17. The method of claim 15, wherein:
the first resource is associated with a first maximum number of HARQ-ACK information bits and the second resource is associated with a second maximum number of HARQ-ACK information bits, and
the first maximum number is smaller than the second maximum number.

* * * * *